(12) United States Patent
Suresh et al.

(10) Patent No.: US 10,797,858 B2
(45) Date of Patent: Oct. 6, 2020

(54) UNIFIED HARDWARE ACCELERATOR FOR SYMMETRIC-KEY CIPHERS

(71) Applicant: Intel Corporation, Santa Clara, CA (US)

(72) Inventors: Vikram B Suresh, Hillsboro, OR (US); Sanu K. Mathew, Hillsboro, OR (US); Sudhir K Satpathy, Hillsboro, OR (US); Vinodh Gopal, Westborough, MA (US)

(73) Assignee: Intel Corporation, Santa Clara, CA (US)

( * ) Notice: Subject to any disclaimer, the term of this patent is extended or adjusted under 35 U.S.C. 154(b) by 200 days.

(21) Appl. No.: 15/887,290

(22) Filed: Feb. 2, 2018

(65) Prior Publication Data

US 2019/0245679 A1    Aug. 8, 2019

(51) Int. Cl.
*H04L 9/00* (2006.01)
*H04L 9/06* (2006.01)
*G09C 1/00* (2006.01)
*G06F 17/16* (2006.01)

(52) U.S. Cl.
CPC .............. *H04L 9/0631* (2013.01); *G09C 1/00* (2013.01); *G06F 17/16* (2013.01); *H04L 2209/125* (2013.01)

(58) Field of Classification Search
CPC .............. G06F 21/6218; G06F 21/602; G06F 2221/2107; G06F 2221/2141; G06F 9/468
See application file for complete search history.

(56) References Cited

U.S. PATENT DOCUMENTS

| | | | | |
|---|---|---|---|---|
| 2010/0057823 A1* | 3/2010 | Filseth | ................. | H04L 9/0631 |
| | | | | 708/492 |
| 2015/0270967 A1* | 9/2015 | Susella | ................. | H04L 9/3093 |
| | | | | 380/30 |
| 2015/0341168 A1* | 11/2015 | Gueron | ................. | H04L 9/0838 |
| | | | | 380/28 |

* cited by examiner

*Primary Examiner* — Ghazal B Shehni
(74) *Attorney, Agent, or Firm* — Schwegman Lundberg & Woessner, P.A.

(57) ABSTRACT

Modifications to Advanced Encryption Standard (AES) hardware acceleration circuitry are described to allow hardware acceleration of the key operations of any non-AES block cipher, such as SMT and Camellia. In some embodiments the $GF(2^8)$ inverse computation circuit in the AES S-box is used to compute $X^{-1}$ (where X is the input plaintext or ciphertext byte), and hardware support is added to compute parallel $GF(2^8)$ matrix multiplications. The embodiments described herein have minimal hardware overhead while achieving greater speed than software implementations.

25 Claims, 24 Drawing Sheets

US 10,797,858 B2

UNIFIED HARDWARE ACCELERATOR FOR SYMMETRIC-KEY CIPHERS

BACKGROUND

The Advanced Encryption Standard (AES) as established by the National Institute of Standard and Technology (NIST) has become the de-facto standard symmetric key encryption cipher for most applications. The AES is extensively supported on many platforms across multiple features. Meanwhile, other symmetric key ciphers have been introduced, notably SM4 and SM4 was standardized by the China Information Security Standardization Technical Committee, and Camellia was standardized by Japan's e-Government Recommended Ciphers List. These and other non-AES ciphers also require operations similar to those performed by AES acceleration hardware such as affine transformations, each with its own distinct mapping matrix A and addition constant, and inversions.

DETAILED DESCRIPTION

Figure 1:
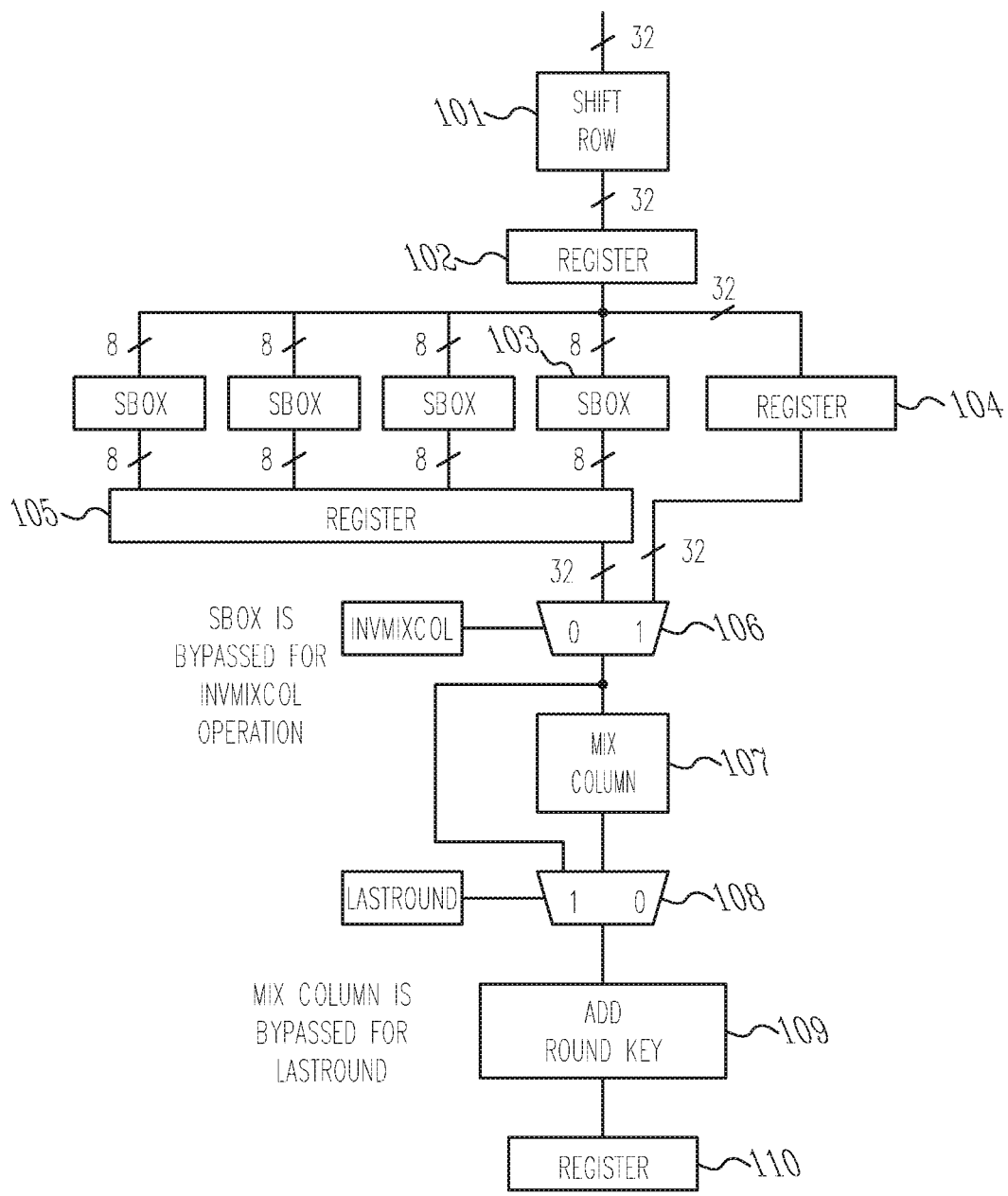
FIG. 1 illustrates an AES hardware accelerator according to some embodiments

Previous solutions for implementing non-AES block ciphers include either implementing them using software/micro-code or to design dedicated hardware accelerators for each individual block cipher. Such software/micro-code implementations of affine and inverse transformations, however, are usually unable to meet desired performance requirements. At the same time, a dedicated hardware accelerator for each non-AES block cipher increases product costs, in terms of silicon area and leakage power, and also brings about a need for significant design and validation efforts. In one aspect, this disclosure proposes a unified hardware accelerator to allow hardware acceleration for both AES and non-AES ciphers with minimal impact to AES performance Described herein is a hardware accelerator for packed affine transformations. The affine transformation is a critical operation in block ciphers such as AES, SM4, and Camellia. This disclosure proposes a compact data pathway that performs parallel affine transformations on the input data or the inverse of input data. In one embodiment, the affine-on-inverse transformation is computed by routing data through an AES S-box and reusing the performance critical inverse circuits present there.

Symmetric key ciphers such as AES, SM4, and Camellia all make use of finite fields (aka, Galois fields, abbreviated GF) in carrying out their arithmetic operations. A finite field is basically a set in which addition, subtraction, multiplication, and division can be performed without leaving the set. One example of a finite field is a set having a prime number in elements such as GF(m) where the elements of field are represented by the integers 0, 1, . . . , m−1 and where addition and multiplication in GF (m) are performed modulo m. The smallest prime finite field is GF(2) where the elements of the field are 0 and 1, where multiplication is equivalent to a logical AND operation, and where addition is equivalent to a logical XOR operation. An extension Galois field having $2^n$ elements, designated as $GF(2^n)$, may also be defined. In $GF(2^n)$, the elements of the field are represented not as integers but as polynomials of maximum degree n−1 with coefficients in GF(2). Motivated by the byte-based nature of computer memory, operations in AES, SM4, and Camellia are performed on 8-bit bytes in $GF(2^8)$ where each 8-bit byte corresponds to the coefficients of one of the 128 possible polynomials of degree 7. Addition and subtraction operations in $GF(2^8)$ are performed in GF(2) and are equivalent operations that amount to bitwise XORing of the bytes that are to be added or subtracted. Multiplication and division in $GF(2^8)$ are defined as modulo operations performed with respect to a specified irreducible generator (or field) polynomial of degree 8 that generates a particular $GF(2^8)$ field from GF(2). For example, the field polynomial used for AES is $AE(x)=(x^8+x^4+x^3+x+1)$ to result in a specific Galois field that may be designated as $GF_{AES}(2^8)$. For reasons of efficiency, some computations such as inversions may be performed in a composite Galois field denoted as $GF_C(2^4)^2$ that is generated by a specified field polynomial P(x) of degree 2 from a ground field $GF(2^4)$ that is generated by a specified field polynomial R(x) of degree 4 from GF(2). The fields $GF_{AES}(2^8)$ and $GF_C(2^4)^2$ are linear isomorphic so that conversion from one to the other can be implemented by matrix multiplication.

During either encryption or decryption, the AES cipher operates on successive 16-byte blocks of data, where each such block is sometimes referred to as the state matrix. In order to encrypt plaintext input data into ciphertext, multiple rounds are performed where each round includes a shift rows operation that permutes the data on a byte level, a byte substitution layer that performs an affine-on-inverse transformation in $GF(2^8)$, a mix columns operation (except for the last round) that also makes use of arithmetic in $GF(2^8)$, and an add round key operation in which the data is bitwise XORed with an input key. AES decryption is similar to encryption and involves reversing the operations used for encryption.

FIG. 1 illustrates the AES portion of a unified hardware accelerator according to one embodiment that implements the stages of the AES algorithm for encryption or decryption as discussed above. The accelerator is shown as operating on one 4-byte column of the 128-bit state matrix input at a time. The shift rows operation is applied by Shift Row circuit 101 with the result stored in register 102. S-box circuits 103 then perform the byte substitution function for each byte with the results stored in register 105. Multiplexer 106 allows the S-boxes 103 to be bypassed by either selecting the outputs of register 105 or the outputs of register 104 to which the outputs of register 102 are clocked in. An InvMixCol input applied to multiplexer 106 selects the outputs of register 102 for further processing by bypassing the S-boxes 103. Such bypassing of the S-boxes 103 is done during a decryption procedure in which the inverse mix columns function is performed. The mix column operation is performed by MixColumn circuit 107. The mix column operation is not performed during the last round of AES encryption and so is bypassed during that round by a Last Round input to multiplexer 108. The Add Round Key circuit 109 performs the add round key operation with the result stored in register 110.

Figure 2:
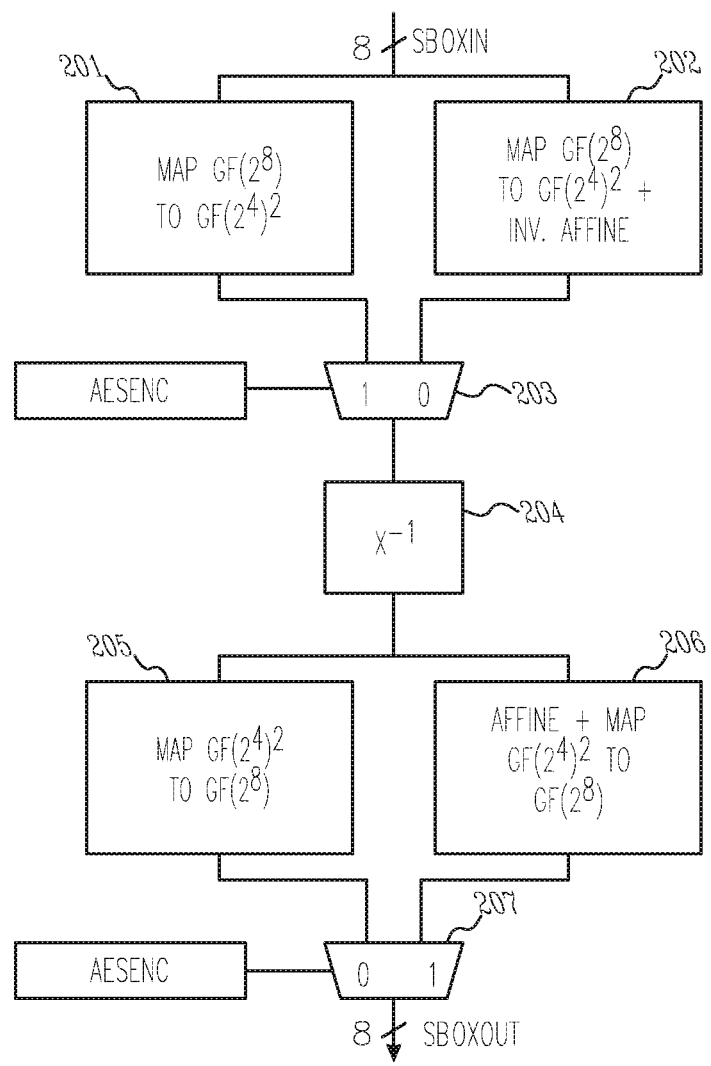
FIG. 2 illustrates the S-box of an AES hardware accelerator according to some embodiments.

FIG. 2 illustrates the S-box 103 of the AES hardware accelerator depicted in FIG. 1 in more detail. The AES inversion operation is carried out in a $CIF(2^4)^2$ composite field that is generated by a specified field polynomial P(x) of degree 2 from a ground field $GF(2^4)$ that is generated by a specified field polynomial R(x) of degree 4 from GF(2). The polynomials P(x) and R(x) are specific for AES inversion and result in a specific $GF(2^4)^2$ composite field that may be referred to as $GF_C(2^4)^2$. Circuit 201 maps the input byte from $GF(2^8)$ to the composite field $GF(2^4)^2$, while circuit 202 maps the input byte from $GF(2^8)$ to the composite field $GF(2^4)^2$ and additionally performs the AES inverse affine transformation (for decryption). In accordance with input AESENC (designating encryption), multiplexer 203 selects between the outputs of circuit 201 and circuit 202 for passing to inversion ($X^{-1}$) circuit 204 that performs inversion of the input vector in $GF(2^4)^2$. The output of inversion circuit 204 is then passed to circuits 205 and 206. Circuit 205 maps the output of inversion circuit 204 from $GF(2^4)^2$ to $GF(2^8)$, while circuit 206 performs the AES affine transformation on the output of inversion circuit 204 and maps the result from $GF(2^4)^2$ to $GF(2^8)$. Multiplexer 207 selects between the outputs of circuit 205 or circuit 206 in accordance with input AESENC. For encryption, the data flow is from circuit 201 to inversion circuit 204 to circuit 206. For decryption, the data flow is from circuit 202 to inversion circuit 204 to circuit 205.

The affine transformation (referred to herein as AFFINE) is a critical linear transformation in the Galois-field of $2^8$ $GF(2^8)$ that is applied to data bytes in symmetric key ciphers such as AES, SM4, and Camellia. It is defined as "A*X+b", where, A is an 8 by 8 bit matrix and b is an 8-bit constant that is applied on the input byte X. All operations in $GF(2^8)$ are defined by a standard-specific generator polynomial of order 8 (e.g., AES uses $x^8+x^4+x^3+x+1$). The affine-on-inverse transformation (referred to herein as AFFINEINV), is defined as "$A*X^{-1}+b$", where $X^{-1}$ is the multiplicative inverse of the input X. These operations are very expensive to implement in software or micro-code, and most modern systems include hardware accelerators to improve performance of these critical crypto transformations. Described herein are alternate data flows and logic to map generic affine operations for non-AES ciphers onto the AES data path without adding significant overhead to AES latency and area. In some embodiments, the $X^{-1}$ circuit of the AES Sbox is reused for the affine-on-inverse operations.

Figure 3:
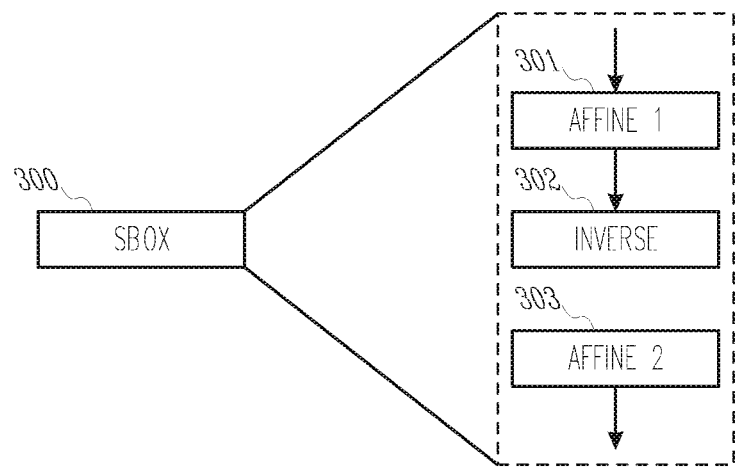
FIG. 3 illustrates a non-AES S-box for a non-AES cipher according to some embodiments.
Figure 4:
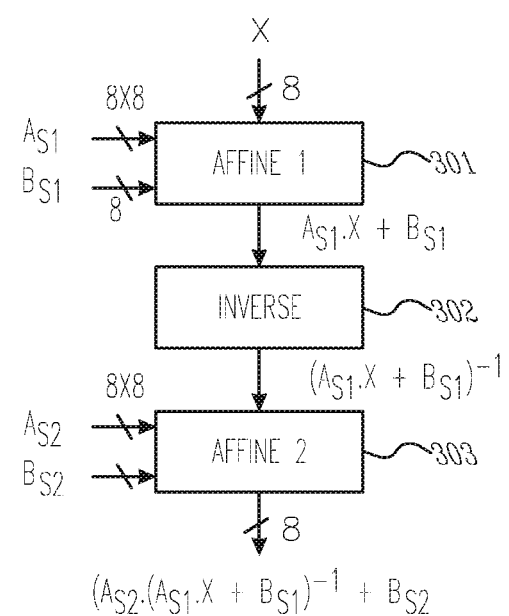
FIG. 4 illustrates the operations of a non-AES S-box for a non-AES cipher according to some embodiments.

FIG. 3 illustrates a non-AES S-box 300 for a non-AES cipher such as the Camellia and SM4 ciphers according to some embodiments. The S-box 300 is made up of a first affine transformation 301, an inversion 302, and second affine transformation 303 after the inversion. FIG. 4 illustrates these operations in more detail. The input x is assumed to be an 8-bit input vector or byte. The first affine transformation 301 is defined as multiplication by a matrix $A_{S1}$ and addition of a vector $b_{S1}$ resulting in:

$$A_{S1}*x+b_{S1}$$

This is followed by inversion to give:

$$(A_{S1}*x+b_{S1})^{-1}$$

The second affine transformation 303 is then applied as multiplication by a matrix Ace and addition of a vector $b_{S2}$ resulting in:

$$A_{S1}*(A_{S1}*x+b_{S1})^{-1}+b_{S2}$$

The matrices $A_{S1}$ and $A_{S2}$ and the translation vectors $b_{S1}$ and $b_{S2}$ are specific for the particular non-AES cypher (e.g., Camellia or SM4). In some embodiments, as described below, a single non-AES affine transformation circuit with variable (i.e., configurable) mapping and translation vector functions is used in a two-pass operation to implement the non-AES S-box. That is, the 8-bit input vector is passed to: the non-AES affine transformation circuitry configured with a mapping function that includes multiplication by a matrix $A_{S1}$ and a translation function that includes addition of a vector $b_{S1}$, the AES S-box with the AES affine transformation bypassed, and the non-AES affine transformation circuitry configured with the mapping function to include multiplication by a matrix $A_{S2}$ and the translation function to include addition of a vector $b_{S2}$.

Operation of the unified hardware accelerator for non-AES ciphers such as Camellia and SM4 will now be described. As described above, the AES S-box operations are performed using the AES hardware accelerator in a single pass. For non-AES ciphers, on the other hand, the S-box logic is implemented in a 2-pass operation. The first affine transformation of the non-AES cipher is mapped to the AFFINE logic of the unified accelerator using the cipher specific affine matrix 'A' and the additive constant 'b'. The second affine transformation of the non-AES cipher is preceded by an inverse computation and hence is mapped to the AFFINEINV logic. However, the reduction polynomials used in the Galois Field computations in SM4 ($x^8+x^7+x^6+x^5+x^4+x^2+1$) and Camellia ($x^8+x^6+x^5+x^3+1$), for example, are different from the one used for AES ($x^8+x^4+x^3+1$). The performance and area limiting inverse computation can be efficiently implemented by mapping the S-box inputs from $GF(2^8)$ to $GF(2^4)^2$ and performing the inverse computation in $GF(2^4)^2$. As a result, both SM4 and Camellia as well as other non-AES ciphers can be mapped using the same composite field as the one used in the AES accelerator. This resolves the issue of different reduction polynomials and enables the use of the same inverse computation logic used for AES processing.

Figure 5:
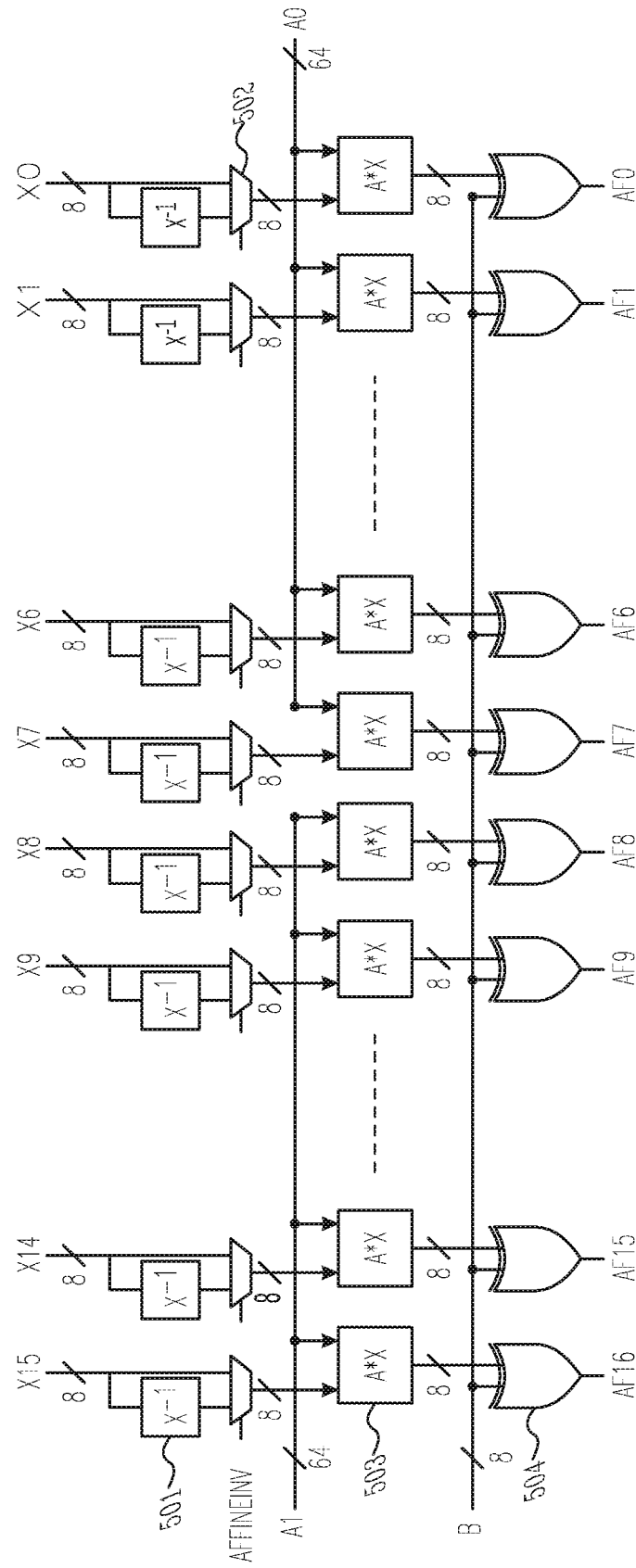
FIG. 5 shows an example of the AFFINE and AFFINE-INV logic of a unified accelerator according to one embodiment.
Figure 6:
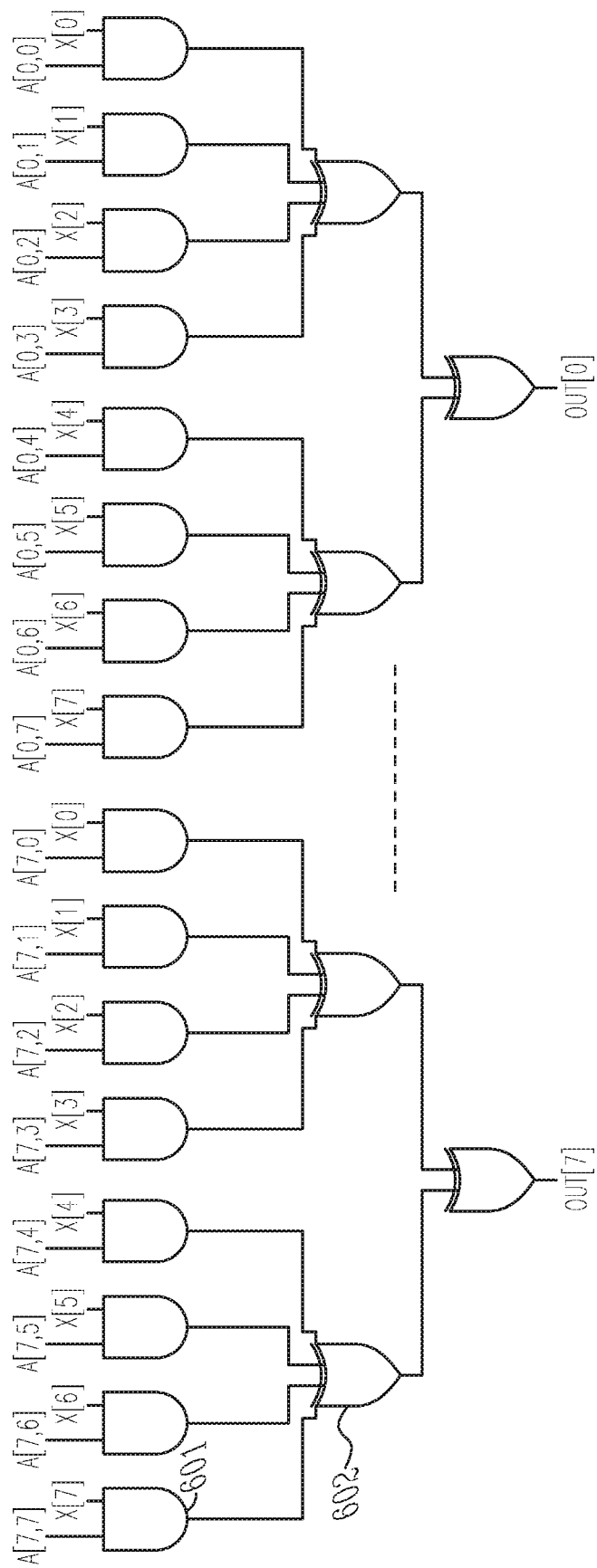
FIG. 6 shows one embodiment of the matrix multiplication stages of the AFFINE and AFFINEINV logic.

FIG. 5 shows an example of the AFFIINE and AFFINE-INV logic of a unified accelerator that is used to implement a non-AES S-box according to one embodiment. The operations are performed on 16 packed 8-bit binary input vectors x[15:0]. The affine operation includes a mapping function and a translation function and is defined by A*x+b. The input A is an 8×8 binary matrix for multiplying with the input vector x (the mapping function) and the vector b is an 8-bit binary input for adding to the product (the translation function). Both the matrix A and the vector b are constant across all 16 parallel transformation operations. The affine-on-inverse operation is defined by $A*x^{-1}+b$, where $x^{-1}$ is the multiplicative inverse of x calculated in $GF(2^8)$ with a reduction polynomial specified in the particular non-AES cipher standard. Multiplexer 502 chooses one of input byte x or its inverse $x^{-1}$ (as a result of going through inversion circuit 501) for affine transformation. As will be described below, in some embodiments, the inversion circuit 501 uses the same S-box used for AES processing. The input selected by multiplexer 502 is then used to compute A*x via matrix multiplier 503, with the lower 8 bytes of inputs operating on one of the 8×8 binary matrices and the upper 8-bytes operating on the other. The A*x function performed by matrix multiplier 503 is the matrix multiplication of A(8×8) with x(8×1) and is implemented as shown in FIG. 6 via AND gates 601 and XOR gates 602. The summation of the output with the vector b translates into parallel XOR operations via XOR gates 504.

While the affine transformation circuitry described above can be implemented with combinations of AND and XOR gates, the inversion circuit is required to compute the multiplicative inverse of x in $GF(2^8)$. This is a computationally expensive operation that may be advantageously be performed by the same S-box used for AES processing. In some non-AES ciphers, such as SM4, the inversion operation is performed on the 8-bit vectors after mapping from $GF(2^8)$ to a $GF(2^4)^2$ composite field using a matrix $M_S$ that is specific for that particular cipher. The inverse computation is performed in $GF(2^4)^2$ on the mapped data $M_S*x$, and the result is mapped back to $GF(2^8)$ using an inverse mapping matrix $M_S^{-1}$ resulting in $M_S^{-1}(M_S*x)^{-1}$. This may be followed by an affine transformation resulting in $A*(M_S^{-1}(M_S*x)^{-1})+b$. The first affine transformation can be directly mapped to the AFFINE logic of the unified accelerator. However, mapping the affine-on-inverse operation to the AES S-box introduces an additional AES mapping term $M_A$ by virtue of the AES S-box mapping to its own composite Galois field as discussed above. To compensate for this, the initial affine transformation matrix may multiplied with $M_S M_A^{-1}$ instead of $M_S$ to perform a combined affine-on-inverse, $GF(2^8)$-to-$GF(2^4)^2$ mapping as well as compensation for the additional $M_A$ term, resulting in the intermediate value of $M_S M_A^{-1} A_{S1}*x$. The translation vector $b_{S1}$ is similarly multiplied by $M_S M_A^{-1}$ to result in a new translation vector $c_{S1}$.

Figure 7:
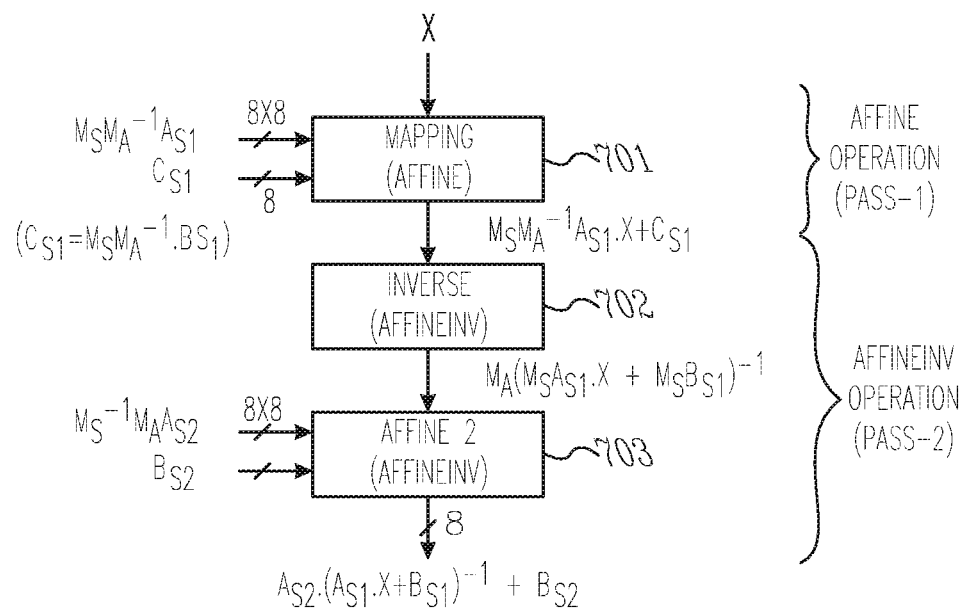
FIG. 7 illustrates one embodiment of the AFFINE and AFFINEINV affine transformation operations.

FIG. 7 shows the first affine transformation 701 with matrix multiplication by the matrix product $M_S M_A^{-1} A_{S1}$ and translation by vector $c_{S1}=M_S M_A^{-1}*b_{S1}$. The term $M_S M_A^{-1} A_{S1}*x++c_{S1}$ may then be used as the input vector x for the inversion stage 702 of the AFFINEINV logic. During inverse computation, the mapping function in the AES Sbox is compensated by the $M_A^{-1}$ to obtain an inverse value of $(M_S*x+M_S b_{S1})^{-1}$. However, the inverse mapping operation in the AES S-box again introduces an additional factor of $M_A^{-1}$ so that the output of the AES S-box is $M_A^{-1}(M_S*x+M_S b_{S1})^{-1}$. Compensation for this additional factor as well as the inverse mapping from the SM4 composite field to the SM4 prime field may achieved by modifying the affine matrix input to the second affine transformation 703 of the AFFINEINV logic from "$A_{S2}$" to "$M_S^{-1} M_A A_{S2}$", resulting in the final AFFINEINV output of $A_{S2}(A_{S1}*x+b_{S1})^{-1}+b_{S2}$. The complete Sbox operation can mapped to a 2-pass implementation of one AFFINE and one AFFINEINV operation each. The S-box operation for other non-AES ciphers such as Camellia can be similarly mapped to the AFFINE/AFFINEINV hardware accelerator, where the matrix $M_S$ is specific for the particular non-AES cipher, to achieve significant performance improvement compared to software implementations. The unified AFFINE/AFFINE-INV accelerator can be further modified to use a separate affine matrix and additive constant for 2/4/8 successive input bytes. This will enable parallel round or key generation operations in case of ciphers such as SM4 (requires 4 S-box operations per round) or Camellia (requires 8 S-box operations per round) to increase the hardware utilization of the unified accelerator.

Figure 8:
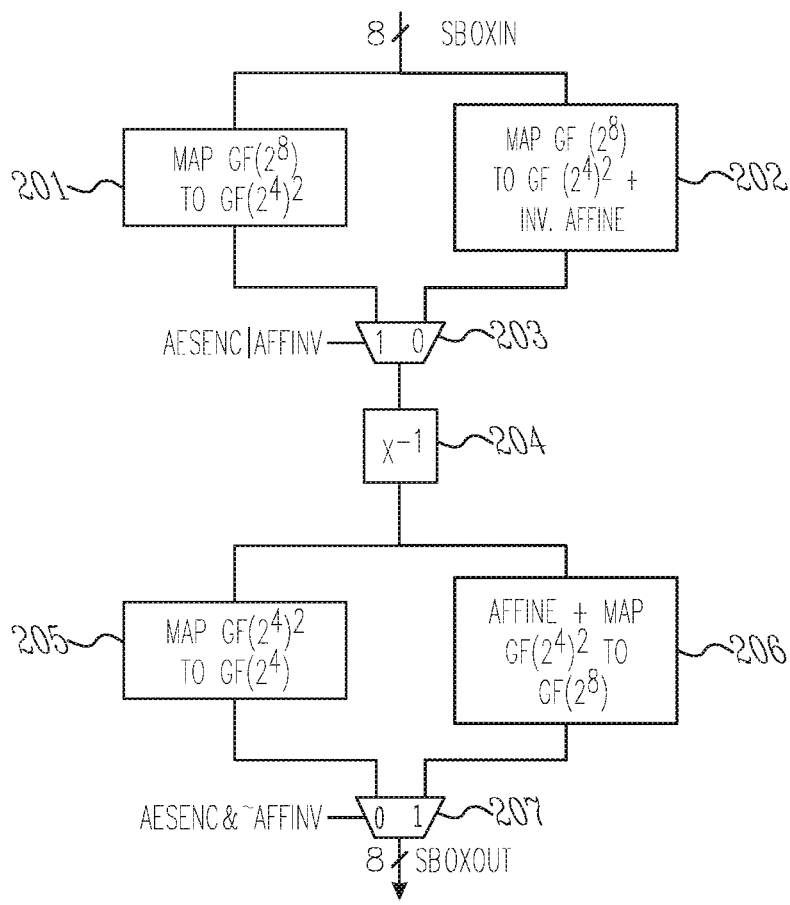
FIG. 8 illustrates one embodiment of a modified AES S-box for performing non-AES inversion operations.

The ALES S-box previously discussed with reference to FIG. 2 may be modified as shown in FIG. 8 to support its reuse to perform the inversion function for non-AES ciphers. Since affine transformations for AES are prefixed, they cannot be used for non-AES ciphers. Accordingly, an additional affine transformation circuit is used for non-AES affine transformations as discussed above. However, the inverse block ($X^{-1}$) can be utilized for non-AES ciphers by introducing a new dataflow that bypasses both AES affine and inverse-affine transformations used for AES encryption and decryption, respectively. As shown in FIG. 8, multiplexer 203 bypasses the ALES inverse affine transformation 202 if either the AESENC input (signifying an AES encryption operation) or the AFFINV input (signifying non-AES affine-on-inverse operation) to the multiplexer 203 is set to 1. Similarly, multiplexer 207 bypasses the AES affine transformation 206 by having the AESENC input and the inverted AFFINV input set to 0. The modified data path shown in FIG. 8 thus maps the input data to $GF(2^4)^2$ at circuit 201, performs inverse computation in $GF(2^4)^2$ at circuit 204, and maps the inverse output back to $GF(2^8)$ at circuit 205. Since the modifications are made to the select signals of the multiplexers 203 and 207, they do not impact the critical path in the S-box implementation.

Figure 9:
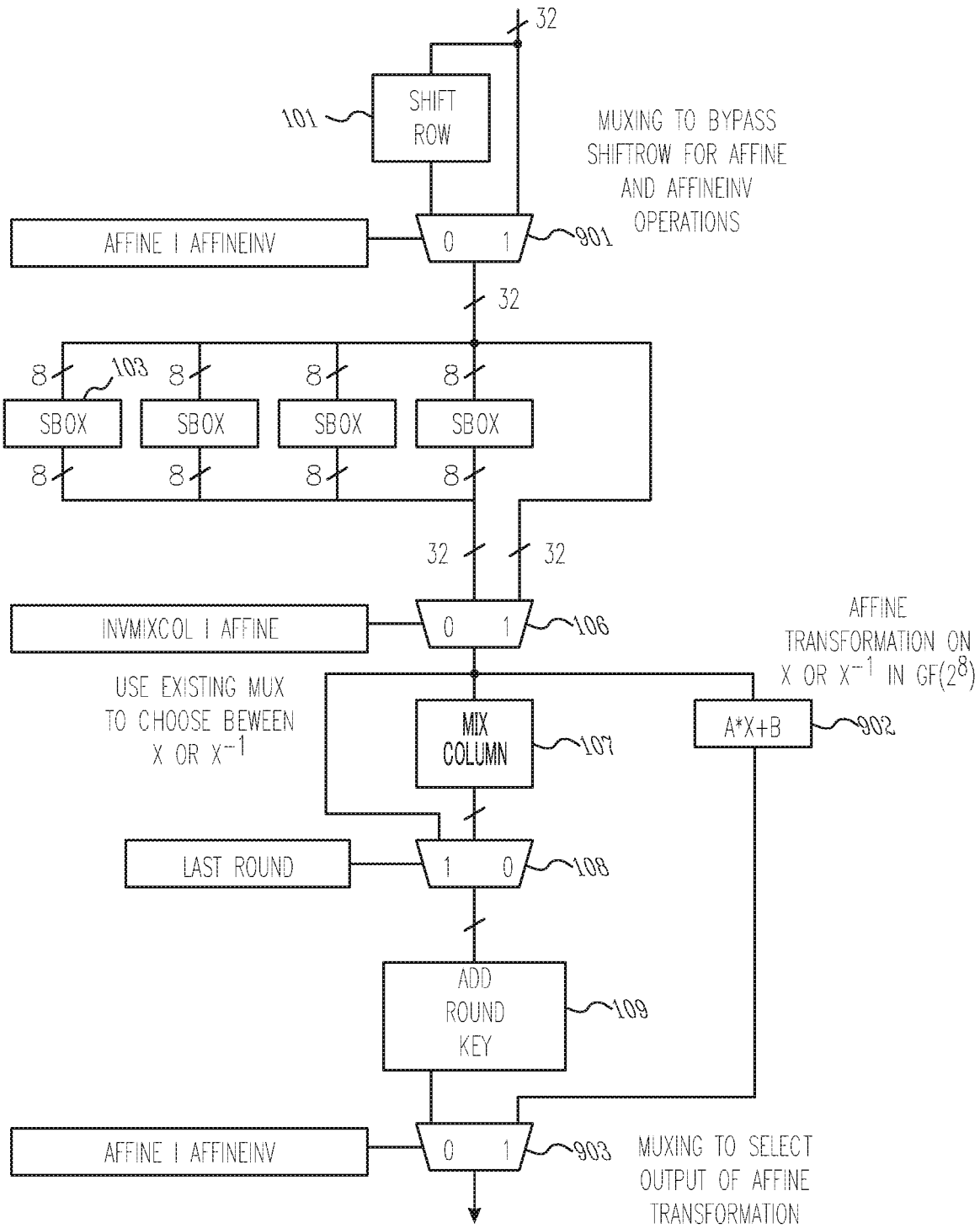
FIG. 9 illustrates one embodiment of a unified accelerator according to some embodiments.

FIG. 9 shows the unified accelerator according to one embodiment that illustrates data paths for both AES and non-ALES ciphers. A separate non-AES affine transformation circuit 902 is provided for non-AES affine transformations that operates in parallel with the Mix Column circuit 106. To perform the non-AES encryption operations of an affine transformation followed by an affine-on-inverse operation, two passes through the circuitry are utilized. During each pass, the shift rows circuit 101 is bypassed by an AFFFNEINV or AFFINE input to multiplexer 901. Also during each pass, the mix column circuit 107 and add round key circuit 109 are bypassed by an AFFINEINV or AFFINE input to multiplexer 903 to result in affine transformation by affine transformation circuity 902. During the first pass, the AES S-boxes 103 are bypassed by an AFFINE input to multiplexer 106 and the first affine transformation is performed by affine transformation circuit 902 with matrix and translation vector inputs as described above with reference to FIG. 7. During the second pass, the inversion operation is performed by the AES S-boxes 103, and the second affine transformation is performed by affine transformation circuit 902 with matrix and translation vector inputs as described above with reference to FIG. 7. As discussed above with reference to FIG. 8, the AES S-boxes 103 are configured to perform inversion only, with the matrix and translation vector inputs to affine transformation circuit 902 configured to compensate for the composite field mapping performed by the AES S-boxes.

Figure 10:
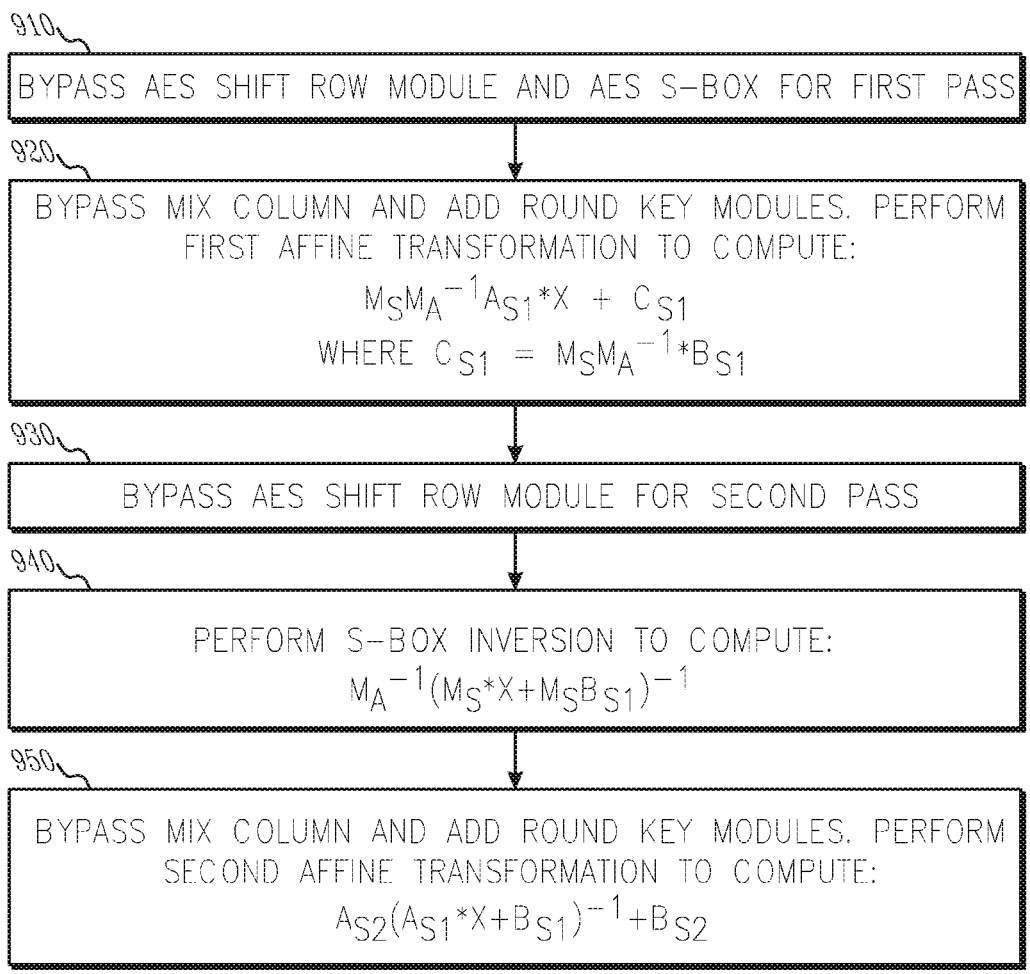
FIG. 10 illustrates a method for performing unified acceleration according to some embodiments.

FIG. 10 illustrates a method for performing unified acceleration by unified accelerator hardware as described above with reference to FIG. 9. The method could be performed, for example, by the accelerator hardware itself or by a processor executing instructions contained in a computer-readable medium. In the latter case, the processor may have an instruction set that includes instructions that, when executed, causes the processor to access the unified accelerator hardware. At stage 910, the shift row circuit and S-boxes are bypassed for the first pass. At stage 920, the mix column and add round key circuits are bypassed, and a first non-AES affine transformation is performed on a non-AES cipher input vector with mapping matrix $M_S M_A^{-1} A_{S1}$ and translation vector $c_{S1}$ to compute: $M_S M_A^{-1} A_{S1} * x + c_{S1}$, where $c_{S1} = M_S M_A^{-1} * b_{S1}$. At stage 930, the shift row circuit is bypassed for the second pass. At stage 940, the S-box inversion is performed to compute: $M_A^{-1}(M_S * x + M_S b_{S1})^{-1}$. As stage 950, the second affine transformation is performed with mapping matrix $M_S^{-1} M_A A_{S2}$ and translation vector $b_{S2}$ to compute: $A_{S2}(A_{S1} * x + b_{S1})^{-1} + b_{S2}$.

Figure 11:
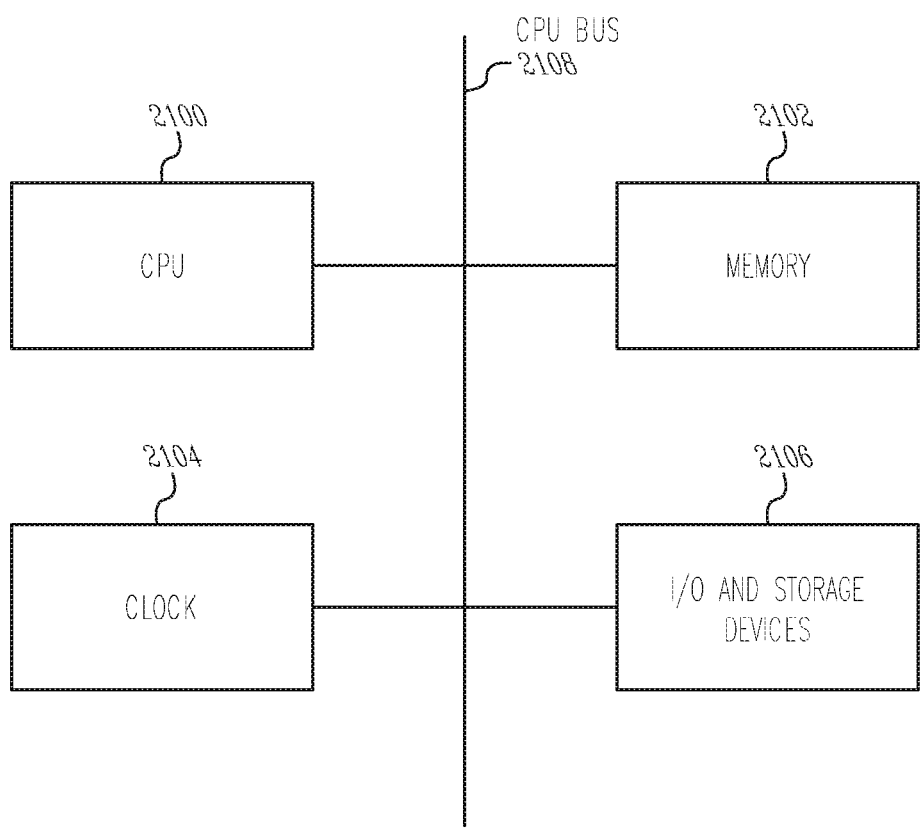
FIG. 11 illustrates one embodiment of a computer system that incorporates a unified accelerator.

FIG. 11 illustrates a computer system according to one embodiment that includes a central processing unit (CPU) 2100, a memory 2102, a clock 2104, and input/output (I/O) and storage devices 2106. These components all communicate over CPU bus 2108. In one embodiment, the unified accelerator hardware is incorporated into the CPU 2100 and is accessible by the CPU's instruction set.

ADDITIONAL NOTES AND EXAMPLES

In Example 1, an apparatus for a cryptographic hardware accelerator, comprises: an AES substitution box (S-box) for an Advanced Encryption Standard (AES) encryption cipher, wherein the AES S-box is to perform an inversion followed by an AES affine transformation on input vectors, wherein the AES affine transformation uses a mapping matrix and translation vector as specified by the AES; non-AES affine transformation circuitry to perform affine transformations on 8-bit input vectors with variable (i.e., configurable) mapping and translation functions; and, circuitry to perform an S-box function for a non-AES cipher that includes circuitry to pass 8-bit input vectors to: the non-AES affine transformation circuitry with a mapping function that includes multiplication by a matrix $A_{S1}$ and a translation function that includes addition of a vector $b_{S1}$, pass the result of the non-AES affine transformation to the AES S-box and bypass the AES affine transformation so as to only perform an inversion, and pass the result of the S-box inversion to the non-AES affine transformation circuitry with the mapping function to include multiplication by a matrix $A_{S2}$ and the translation function to include addition of a vector $b_{S2}$.

In Example 2, the subject matter of Example 1 or any of the Examples herein may optionally include wherein: affine transformations for the non-AES cipher are defined as being performed in a Galois extension field denoted as $GF_S(2^8)$ that is generated from GF(2) by a specified field polynomial S(x) of degree 8; the AES S-box is to perform the inversion operation in a composite Galois field denoted as $GF_C((2^4)^2)$ that is generated by a specified field polynomial P(x) of degree 2 from a ground field $GF(2^4)$ that is generated by a specified field polynomial R(x) of degree 4 from GF(2); and, the non-AES affine transformation circuitry is configured with a mapping function that includes multiplication by a matrix $M_S$ that maps vectors from $GF_S(2^8)$ to $GF_C((2^4)^2)$ before inversion by the S-box and that includes multiplication by a matrix $M_S^{-1}$ that maps vectors from $GF_C((2^4)^2)$ to $GF_S(2^8)$ after inversion by the S-box.

In Example 3, the subject matter of Example 2 or any of the Examples herein may optionally include wherein: affine transformations for the AES cipher are defined as being performed in a Galois extension field denoted as $GF_{AE}(2^8)$, wherein the $GF_{AE}(2^8)$ field is generated from a Galois field GF(2) by a specified field polynomial AE(x) of degree 8 where $AE(x)=(x^8+x^4+x^3+x+1)$; wherein the AES S-box is further to map vectors from the $GF_{AE}(2^8)$ field to the $GF_C((2^4)^2)$ field by multiplication in GF(2) with a matrix $M_A$ before inversion and to map the inverted vectors back from $GF_C((2^4)^2)$ to $GF_{AE}(2^8)$ with a matrix $M_A^{-1}$ after inversion; and, the non-AES affine transformation circuitry is configured with a mapping function that includes multiplication by the matrix $M_A^{-1}$ before inversion by the S-box and that includes multiplication by the matrix $M_A$ after inversion by the S-box.

In Example 4, the subject matter of Example 1 or any of the Examples herein may optionally include: a shift rows circuit, a mix column circuit, and a key addition circuit to perform encryption/decryption in accordance with the AES cipher; and wherein the circuitry to perform an S-box function for the non-AES cipher circuitry includes circuitry to bypass the shift rows circuit, mix column circuit, and key addition circuit.

In Example 5, the subject matter of Example 3 or any of the Examples herein may optionally include: an AES encryption pathway through the S-box that includes a first encryption operation that multiplies an input vector by the matrix $M_A$, a second encryption operation that inverts the result, and a third encryption operation that performs the AES affine transformation followed by multiplication with the matrix $M_A^{-1}$; an AES decryption pathway through the S-box that includes a first decryption operation that multiplies an input vector by the matrix $M_A$ followed by AES inverse affine transformation, a second decryption operation that inverts the result, and a third decryption operation that performs multiplication by the matrix $M_A^{-1}$; wherein the circuitry to perform an S-box function for the non-AES cipher, in order to bypass the AES transformation and the AES inverse transformation of the S-box, includes a pathway through the S-box that includes the first encryption operation, the second encryption or decryption operation, and the third decryption operation.

In Example 6, the subject matter of Example 3 or any of the Examples herein may optionally include wherein: the non-AES affine transformation circuitry is configured with a mapping function that includes multiplication by the matrix product $M_S M_A^{-1} A_{S1}$ and translation that includes addition of the vector product $M_S M_A^{-1} * b_1$ before inversion by the AES S-box; and, the non-AES affine transformation circuitry is configured with a mapping function that includes multiplication by the matrix product $M_A M_S^{-1} A_{S2}$ and translation that includes addition of the vector $b_2$ after inversion by the AES S-box.

In Example 7, the subject matter of Example 1 or any of the Examples herein may optionally include wherein the non-AES encryption cipher is SM4 where the field polynomial $S(x)$ is: $S(x)=(x^8+x^7+x^6+x^5+x^4+x^2+1)$.

In Example 8, the subject matter of Example 1 or any of the Examples herein may optionally include wherein the non-AES encryption cipher is Camellia where the field polynomial $S(x)$ is: $S(x)=(x^8+x^6+x^5+x^3+1)$.

In Example 9, the subject matter of Example 1 or any of the Examples herein may optionally include wherein the apparatus is incorporated into a central processing unit (CPU) accessible by the CPU's instruction set.

In Example 10, the subject matter of Example 1 or any of the Examples herein may optionally include wherein the apparatus is incorporated into a coprocessor or other device to interface to a central processing unit (CPU).

In Example 11, a method for utilizing Advanced Encryption Standard (AES) acceleration hardware to perform non-AES cipher operations, comprises: performing a first non-AES affine transformation on a non-AES cipher input vector, wherein the first non-AES affine transformation is a mapping that includes multiplication by a matrix $A_{S1}$ and a translation that includes addition of a vector $b_{S1}$; passing the input vector after the first affine transformation to an AES substitution box (S-box) for an AES encryption cipher, wherein the AES S-box performs an inversion followed by an AES affine transformation on input vectors, wherein the AES affine transformation uses a mapping matrix and translation vector as specified by the AES; bypassing the AES affine transformation of the AES S-box; and, performing a second non-AES affine transformation on the input vector after inversion by the AES S-box, wherein the second non-AES affine transformation is a mapping that includes multiplication by a matrix $A_{S2}$ and a translation that includes addition of a vector $b_{S2}$.

In Example 12, the subject matter of Example 11 or any of the Examples herein may optionally include wherein: affine transformations for the non-AES cipher are defined as being performed in a Galois extension field denoted as $GF_S(2^8)$ that is generated from $GF(2)$ by a specified field polynomial $S(x)$ of degree 8; the AES S-box performs the inversion operation in a composite Galois field denoted as $GF_C((2^4)^2)$ that is generated by a specified field polynomial $P(x)$ of degree 2 from a ground field $GF(2^4)$ that is generated by a specified field polynomial $R(x)$ of degree 4 from $GF(2)$; the first non-AES affine transformation is a mapping that includes multiplication by a matrix $M_S$ that maps vectors from $GF_S(2^8)$ to $GF_C((2^4)^2)$; and, the second non-AES affine transformation is a mapping that includes multiplication by a matrix $M_S^{-1}$ that maps vectors from $GF_C((2^4)^2)$ to $GF_S(2^8)$.

In Example 13, the subject matter of Example 11 or any of the Examples herein may optionally include wherein: transformations for the AES cipher are defined as being performed in a Galois extension field denoted as $GF_{AE}(2^8)$, wherein the $GF_{AE}(2^8)$ field is generated from a Galois field $GF(2)$ by a specified field polynomial $AE(x)$ of degree 8 where $AE(x)=(x^8+x^4+x^3+x+1)$; wherein the AES S-box maps vectors from the $GF_{AE}(2^8)$ field to the $GF_C((2^4)^2)$ field by multiplication in $GF(2)$ with a matrix $M_A$ before inversion and maps the inverted vectors back from $GF_C((2^4)^2)$ to $GF_{AE}(2^8)$ with a matrix $M_A^{-1}$ after inversion; the first non-AES affine transformation is a mapping that includes multiplication by the matrix $M_A^{-1}$; and, the second non-AES affine transformation is a mapping that includes multiplication by the matrix $M_A$.

In Example 14, the subject matter of Example 11 or any of the Examples herein may optionally include wherein the AES acceleration hardware includes a shift rows circuit, a mix column circuit, and a key addition circuit to perform encryption/decryption in accordance with the AES cipher, and further comprising bypassing the shift rows circuit, mix column circuit, and key addition circuit when performing non-AES cipher operations.

In Example 15, the subject matter of Example 13 or any of the Examples herein may optionally include wherein: an AES encryption pathway through the S-box includes a first encryption operation that multiplies an input vector by the matrix $M_A$, a second encryption operation that inverts the result, and a third encryption operation that performs the AES affine transformation followed by multiplication with the matrix $M_A^{-1}$, an AES decryption pathway through the S-box includes a first decryption operation that multiplies an input vector by the matrix $M_A$ followed by AES inverse affine transformation, a second decryption operation that inverts the result, and a third decryption operation that performs multiplication by the matrix $M_A^{-1}$; and, further comprising bypassing the AES transformation and the AES inverse transformation of the S-box by traversing a pathway through the S-box that includes the first encryption operation, the second encryption or decryption operation, and the third decryption operation.

In Example 16, the subject matter of Example 13 or any of the Examples herein may optionally include performing the first non-AES affine transformation with a mapping function that includes multiplication by the matrix product $M_S M_A^{-1} A_{S1}$ and with a translation function that includes addition of the vector product $M_S M_A^{-1} * b_1$; and, performing the second non-AES affine transformation with a mapping function that includes multiplication by the matrix product $M_A M_S^{-1} A_{S2}$ and with a translation function that includes addition of the vector $b_2$ after inversion by the S-box.

In Example 17, the subject matter of Example 13 or any of the Examples herein may optionally include wherein the non-AES encryption cipher is SM4 where the field polynomial $S(x)$ is:

$$S(x)=(x^8+x^7+x^6+x^5+x^4+x^2+1).$$

In Example 18, the subject matter of Example 13 or any of the Examples herein may optionally include wherein the non-AES encryption cipher is Camellia where the field polynomial $S(x)$ is:

$$S(x)=(x^8+x^6+x^5+x^3+1).$$

In Example 19, a computer-readable storage medium comprising instructions to cause processing circuitry having an instruction set for Advanced Encryption Standard (AES) cryptographic hardware acceleration, upon execution of the instructions by the processing circuitry, to: perform a first non-AES affine transformation on a non-AES cipher input vector, wherein the first non-AES affine transformation is a mapping that includes multiplication by a matrix $A_{S1}$ and a translation that includes addition of a vector $b_{S1}$; pass the input vector after the first non-AES affine transformation to an AES substitution box (S-box) for an AES encryption cipher, wherein the AES S-box performs an inversion followed by an AES affine transformation on input vectors, wherein the AES affine transformation uses a mapping matrix and translation vector as specified by the AES;

bypass the AES affine transformation of the AES S-box; and, perform a second non-AES affine transformation on the input vector after inversion by the AES S-box, wherein the second non-AES affine transformation is a mapping that includes multiplication by a matrix $A_{S2}$ and a translation that includes addition of a vector $b_{S2}$.

In Example 20, the subject matter of Example 19 or any of the Examples herein may optionally include wherein: affine transformations for the non-AES cipher are defined as being performed in a Galois extension field denoted as $GF_S(2^8)$ that is generated from $GF(2)$ by a specified field polynomial $S(x)$ of degree 8; the AES S-box performs the inversion operation in a composite Galois field denoted as $GF_C((2^4)^2)$ that is generated by a specified field polynomial $P(x)$ of degree 2 from a ground field $GF(2^4)$ that is generated by a specified field polynomial $R(x)$ of degree 4 from $GF(2)$; the first non-AES affine transformation means is a mapping that includes multiplication by a matrix $M_S$ that maps vectors from $GF_S(2^8)$ to $GF_C((2^4)^2)$; and, the second non-AES affine transformation means is a mapping that includes multiplication by a matrix $M_S^{-1}$ that maps vectors from $GF_C((2^4)^2)$ to $GF_S(2^8)$.

In Example 21, the subject matter of Example 19 or any of the Examples herein may optionally include wherein: affine transformations for the AES cipher are defined as being performed in a Galois extension field denoted as $GF_{AE}(2^8)$, wherein the $GF_{AE}(2^8)$ field is generated from a Galois field $GF(2)$ by a specified field polynomial $AE(x)$ of degree 8 where $AE(x)=(x^8+x^4+x^3+x+1)$; the AES S-box maps vectors from the $GF_{AE}(2^8)$ field to the $GF_C((2^4)^2)$ field by multiplication in $GF(2)$ with a matrix $M_A$ before inversion and maps the inverted vectors back from $GF_C((2^4)^2)$ to $GF_{AE}(2^8)$ with a matrix $M_A^{-1}$ after inversion; the first non-AES affine transformation is a mapping that includes multiplication by the matrix $M_A^{-1}$; and, the second non-AES affine transformation is a mapping that includes multiplication by the matrix $M_A$.

In Example 22, the subject matter of Example 19 or any of the Examples herein may optionally include instructions to: perform the first non-AES affine transformation with a mapping function that includes multiplication by the matrix product $M_S M_A^{-1} A_{S1}$ and with a translation function that includes addition of the vector product $M_S M_A^{-1} * b_1$; and, perform the second non-AES affine transformation with a mapping function that includes multiplication by the matrix product $M_A M_S^{-1} A_{S2}$ and with a translation function that includes addition of the vector $b_2$ after inversion by the S-box.

In Example 23, the subject matter of Example 20 or any of the Examples herein may optionally include wherein the non-AES encryption cipher is SM4 where the field polynomial $S(x)$ is:

$S(x)=(x^8+x^7+x^6+x^5+x^4+x^2+1)$.

In Example 24, the subject matter of Example 20 or any of the Examples herein may optionally include wherein the non-AES encryption cipher is Camellia where the field polynomial $S(x)$ is:

$S(x)=(x^8+x^6+x^5+x^3+1)$.

In Example 25, the subject matter of Example 19 or any of the Examples herein may optionally include wherein the processing circuitry is a central processing unit (CPU) having an instruction set for AES hardware acceleration and affine transformations.

In Example 26, an apparatus for Advanced Encryption Standard (AES) acceleration hardware to perform non-AES cipher operations, comprises: means for performing a first non-AES affine transformation on a non-AES cipher input vector, wherein the first non-AES affine transformation is a mapping that includes multiplication by a matrix $A_{S1}$ and a translation that includes addition of a vector $b_{S1}$; means for passing the input vector after the first non-AES affine transformation to an AES substitution box (S-box) for an AES encryption cipher, wherein the AES S-box performs an inversion followed by an AES affine transformation on input vectors, wherein the AES affine transformation uses a mapping matrix and translation vector as specified by the AES; means for bypassing the AES affine transformation of the AES S-box; and, means for performing a second non-AES affine transformation on the input vector after inversion by the AES S-box, wherein the second non-AES affine transformation is a mapping that includes multiplication by a matrix $A_{S2}$ and a translation that includes addition of a vector $b_{S2}$ In Example 27, the subject matter of Example 26 or any of the Examples herein may optionally include wherein: non-AES affine transformations for the non-AES cipher are defined as being performed in a Galois extension field denoted as $GF_S(2^8)$ that is generated from $GF(2)$ by a specified field polynomial $S(x)$ of degree 8; the AES S-box performs the inversion operation in a composite Galois field denoted as $GF_C((2^4)^2)$ that is generated by a specified field polynomial $P(x)$ of degree 2 from a ground field $GF(2^4)$ that is generated by a specified field polynomial $R(x)$ of degree 4 from $GF(2)$; the first non-AES affine transformation is a mapping that includes multiplication by a matrix $M_S$ that maps vectors from $GF_S(2^8)$ to $GF_C((2^4)^2)$; and, the second non-AES affine transformation is a mapping that includes multiplication by a matrix $M_S^{-1}$ that maps vectors from $GF_C((2^4)^2)$ to $GF_S(2^8)$.

In Example 28, the subject matter of Example 26 or any of the Examples herein may optionally include wherein: affine transformations for the AES cipher are defined as being performed in a Galois extension field denoted as $GF_{AE}(2^8)$, wherein the $GF_{AE}(2^8)$ field is generated from a Galois field $GF(2)$ by a specified field polynomial $AE(x)$ of degree 8 where $AE(x)=(x^8+^4+x^3+x+1)$; the AES S-box maps vectors from the $GF_{AE}(2^8)$ field to the $GF_C((2^4)^2)$ field by multiplication in $GF(2)$ with a matrix $M_A$ before inversion and maps the inverted vectors back from $GF_C((2^4)^2)$ to $GF_{AE}(2^8)$ with a matrix $M_A^{-1}$ after inversion; the first non-AES affine transformation is a mapping that includes multiplication by the matrix $M_A^{-1}$; and, the second non-AES affine transformation is a mapping that includes multiplication by the matrix $M_A$.

In Example 29, the subject matter of Example 26 or any of the Examples herein may optionally include wherein the AES acceleration hardware includes a shift rows circuit, a mix column circuit, and a key addition circuit to perform encryption/decryption in accordance with the AES cipher, and further comprising means for bypassing the shift rows circuit, mix column circuit, and key addition circuit when performing non-AES cipher operations.

In Example 30, the subject matter of Example 26 or any of the Examples herein may optionally include wherein: an AES encryption pathway through the AES S-box includes a first encryption operation that multiplies an input vector by the matrix $M_A$, a second encryption operation that inverts the result, and a third encryption operation that performs the AES affine transformation followed by multiplication with the matrix $M_A^{-1}$; an AES decryption pathway through the AES S-box includes a first decryption operation that multiplies an input vector by the matrix $M_A$ followed by AES inverse affine transformation, a second decryption operation that inverts the result, and a third decryption operation that performs multiplication by the matrix $M_A^{-1}$; and, further comprising means for bypassing the AES affine transformation and the AES inverse transformation of the S-box by traversing a pathway through the S-box that includes the first encryption operation, the second encryption or decryption operation, and the third decryption operation.

In Example 31, the subject matter of Example 28 or any of the Examples herein may optionally include: means for performing the first non-AES affine transformation with a mapping function that includes multiplication by the matrix product $M_S M_A^{-1} A_{S1}$ and with a translation function that includes addition of the vector product $M_S M_Z^{-1} * b_1$; and, means for performing the second non-AES affine transformation with a mapping function that includes multiplication by the matrix product $M_A M_S^{-1} A_{S2}$ and with a translation function that includes addition of the vector $b_2$ after inversion by the S-box.

In Example 32, the subject matter of Example 26 or any of the Examples herein may optionally include wherein the non-AES encryption cipher is SM4 where the field polynomial S(x) is:

$$S(x)=(x^8+x^7+x^6+x^5+x^4+x^2+1).$$

In Example 33, the subject matter of Example 26 or any of the Examples herein may optionally include wherein the non-AES encryption cipher is Camellia where the field polynomial S(x) is:

$$S(x)=(x^8+x^6+x^5+x^3+1).$$

In Example 34, a computer system, comprises: a central processing unit (CPU) and memory; a CPU bus to enable the CPU to communicate with the memory; wherein the CPU has an extended instruction set for Advanced Encryption Standard (AES) and non-AES cryptographic hardware acceleration such that execution of instructions contained within the extended instruction set by the CPU causes the CPU to: perform a first non-AES affine transformation on a non-AES cipher input vector, wherein the first non-AES affine transformation is a mapping that includes multiplication by a matrix $A_{S1}$ and a translation that includes addition of a vector $b_{S1}$; pass the input vector after the first non-AES affine transformation to an AES substitution box (S-box) for an AES encryption cipher, wherein the AES S-box performs an inversion followed by an AES affine transformation on input vectors, wherein the AES affine transformation uses a mapping matrix and translation vector as specified by the AES; bypass the AES affine transformation of the AES S-box; and, perform a second non-AES affine transformation on the input vector after inversion by the AES S-box, wherein the second non-AES affine transformation is a mapping that includes multiplication by a matrix $A_{S2}$ and a translation that includes addition of a vector $b_{S2}$.

In Example 35, the subject matter of Example 34 or any of the Examples herein may optionally include wherein: affine transformations for the non-AES cipher are defined as being performed in a Galois extension field denoted as $GF_S(2^8)$ that is generated from GF(2) by a specified field polynomial S(x) of degree 8; the AES S-box performs the inversion operation in a composite Galois field denoted as $GF_C((2^4)^2)$ that is generated by a specified field polynomial P(x) of degree 2 from a ground field $GF(2^4)$ that is generated by a specified field polynomial R(x) of degree 4 from GF(2); the first non-AES affine transformation means is a mapping that includes multiplication by a matrix $M_S$ that maps vectors from $GF_S(2^8)$ to $GF_C((2^4)^2)$; and, the second non-AES affine transformation means is a mapping that includes multiplication by a matrix $M_S^{-1}$ that maps vectors from $GF_C((2^4)^2)$ to $GF_S(2^8)$.

In Example 36, the subject matter of Example 34 or any of the Examples herein may optionally include wherein: affine transformations for the AES cipher are defined as being performed in a Galois extension field denoted as $GF_{AE}(2^8)$, wherein the $GF_{AE}(2^8)$ field is generated from a Galois field GF(2) by a specified field polynomial AE(x) of degree 8 where $AE(x)=(x^8+x^4+x^3+x+1)$; the AES S-box maps vectors from the $GF_{AE}(2^8)$ field to the $GF_C((2^4)^2)$ field by multiplication in GF(2) with a matrix $M_A$ before inversion and maps the inverted vectors back from $GF_C((2^4)^2)$ to $GF_{AE}(2^8)$ with a matrix $M_A^{-1}$; after inversion; the first non-AES affine transformation is a mapping that includes multiplication by the matrix $M_A^{-1}$; and, the second non-AES affine transformation is a mapping that includes multiplication by the matrix $M_A$.

In Example 37, the subject matter of Example 34 or any of the Examples herein may optionally include wherein the extended instruction set further comprises instructions that when executed cause the CPU to: perform the first non-AES affine transformation with a mapping function that includes multiplication by the matrix product $M_S M_A^{-1} A_{S1}$ and with a translation function that includes addition of the vector product $M_S M_A^{-1} * b_1$; and, perform the second non-AES affine transformation with a mapping function that includes multiplication by the matrix product $M_A M_S^{-1} A_{S2}$ and with a translation function that includes addition of the vector $b_2$ after inversion by the S-box.

In Example 38, the subject matter of Example 35 or any of the Examples herein may optionally include wherein the non-AES encryption cipher is SM4 where the field polynomial S(x) is:

$$S(x)=(x^8+x^7+x^6+x^5+x^4+x^2+1).$$

In Example 39, the subject matter of Example 35 or any of the Examples herein may optionally include wherein the non-AES encryption cipher is Camellia where the field polynomial S(x) is:

$$S(x)=(x^8+x^6+x^5+x^3+1).$$

Example 40 is at least one machine-readable medium including instructions that, when executed by a processor, cause the processor to perform operations to implement of any of Examples 1 through 33.

Example 41 is an apparatus comprising means to implement any of Examples 1 through 33.

Example 42 is a system to implement of any of Examples 1 through 33.

Example 43 is a method to implement of any of Examples 1 through 33.

Example Architectures

The figures discussed below detail exemplary architectures and systems to implement embodiments of the above. In some embodiments, one or more hardware components and/or instructions described above are emulated as detailed below, or implemented as software circuits.

Embodiments of the instruction(s) detailed above are embodied may be embodied in a "generic vector friendly instruction format" which is detailed below. In other embodiments, such a format is not utilized and another instruction format is used, however, the description below of the writemask registers, various data transformations (swizzle, broadcast, etc.), addressing, etc. is generally applicable to the description of the embodiments of the instruction(s) above. Additionally, exemplary systems, architectures, and pipelines are detailed below. Embodiments of the instruction(s) above may be executed on such systems, architectures, and pipelines, but are not limited to those detailed.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats) For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, September 2014; and see Intel® Advanced Vector Extensions Programming Reference, October 2014).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 12A:
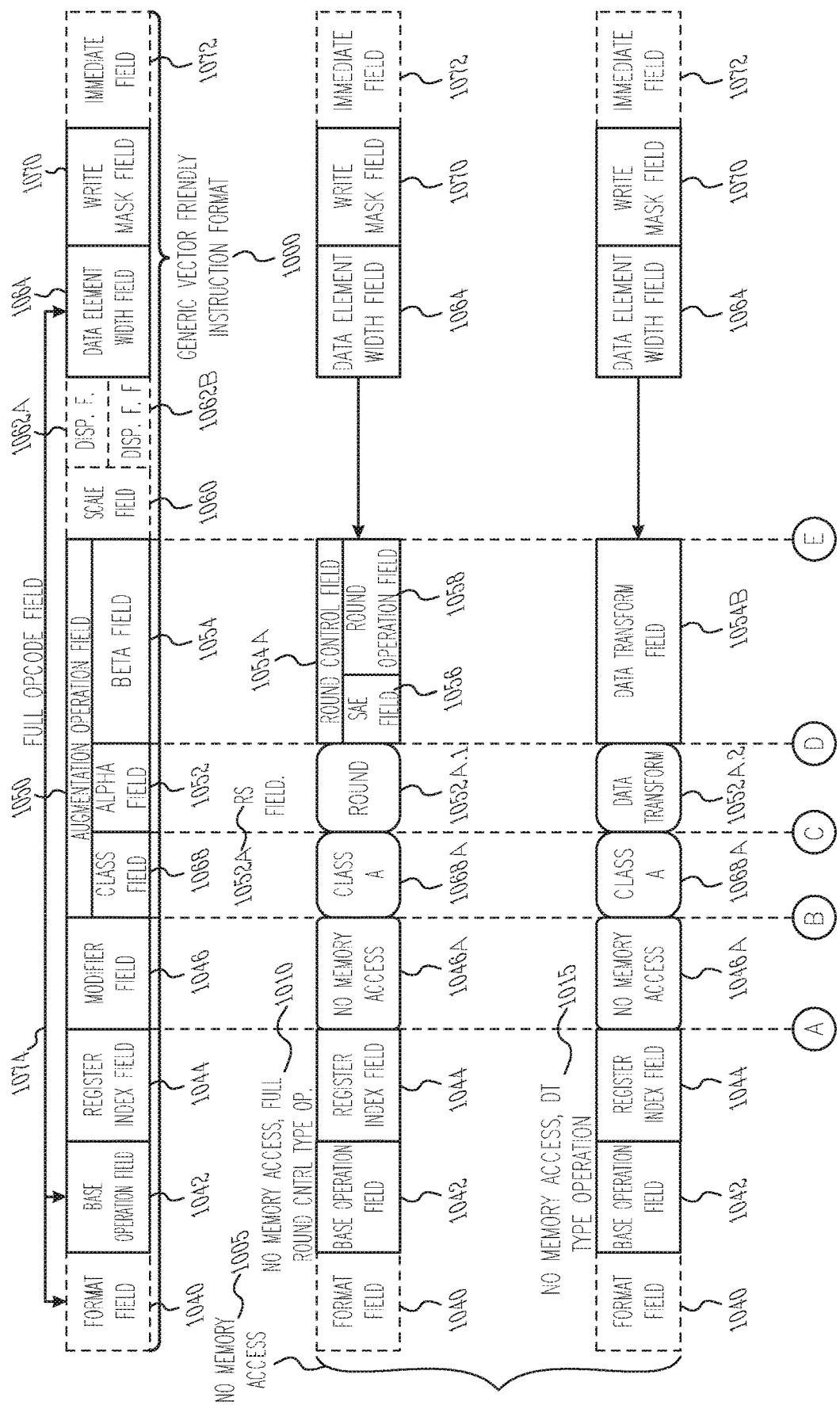
FIGS. 12A-12B are block diagrams illustrating a generic vector friendly instruction format and instruction templates thereof according to some embodiments.
Figure 12A:
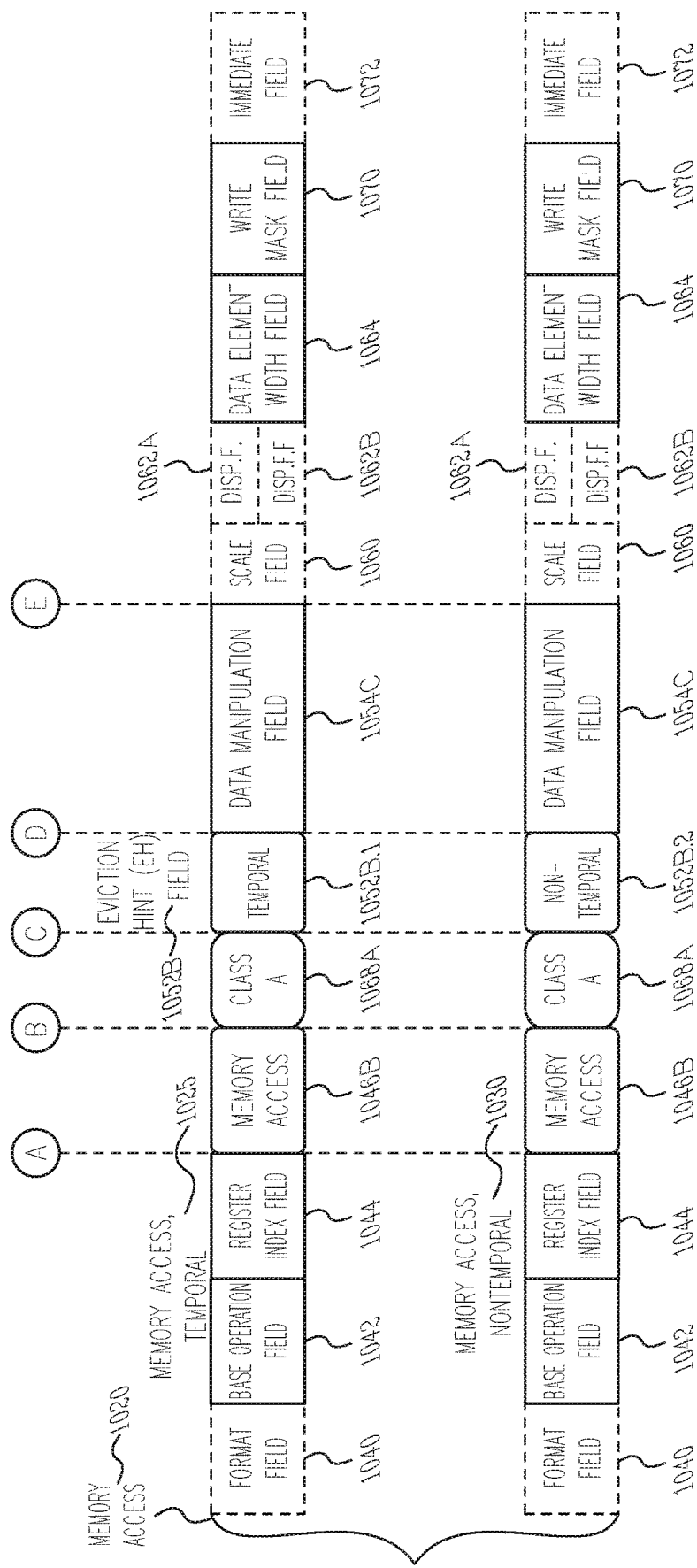
Figure 12B:
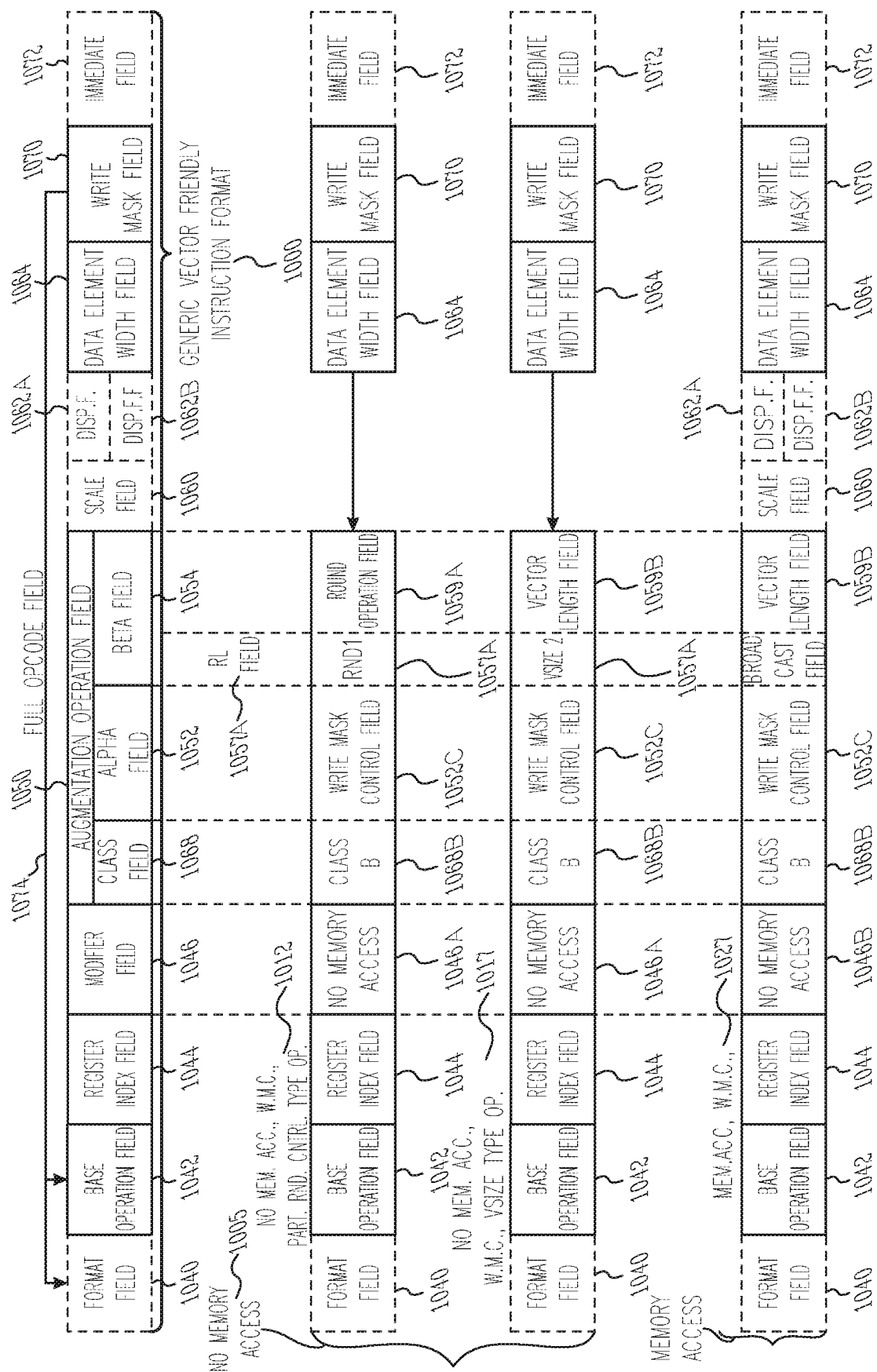

FIGS. 12A-12B are block diagrams illustrating a generic vector friendly instruction format and instruction templates thereof according to embodiments of the invention.

FIG. 12A is a block diagram illustrating a generic vector friendly instruction format and class A instruction templates thereof according to embodiments of the invention; while FIG. 12B is a block diagram illustrating the generic vector friendly instruction format and class B instruction templates thereof according to embodiments of the invention. Specifically, a generic vector friendly instruction format 1000 for which are defined class A and class B instruction templates, both of which include no memory access 1005 instruction templates and memory access 1020 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 12A include: 1) within the no memory access 1005 instruction templates there is shown a no memory access, full round control type operation 1010 instruction template and a no memory access, data transform type operation 1015 instruction template; and 2) within the memory access 1020 instruction templates there is shown a memory access, temporal 1025 instruction template and a memory access, non-temporal 1030 instruction template. The class B instruction templates in FIG. 12B include: 1) within the no memory access 1005 instruction templates there is shown a no memory access, write mask control, partial round control type operation 1012 instruction template and a no memory access, write mask control, vsize type operation 1017 instruction template; and 2) within the memory access 1020 instruction templates there is shown a memory access, write mask control 1027 instruction template.

The generic vector friendly instruction format 1000 includes the following fields listed below in the order illustrated in FIGS. 12A-12B.

Format field 1040—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 1042—its content distinguishes different base operations.

Register index field 1044—its content, directly or through address generation, specifies the locations of the source and destination operands, be they in registers or in memory. These include a sufficient number of bits to select N registers from a PxQ 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 1046—its content distinguishes occurrences of instructions in the generic vector instruction format that specify memory access from those that do not; that is, between no memory access 1005 instruction templates and memory access 1020 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 1050—its content distinguishes which one of a variety of different operations to be performed in addition to the base operation. This field is context specific. In one embodiment of the invention, this field is divided into a class field 1068, an alpha field 1052, and a beta field 1054. The augmentation operation field 1050 allows common groups of operations to be performed in a single instruction rather than 2, 3, or 4 instructions.

Scale field 1060—its content allows for the scaling of the index field's content for memory address generation (e.g., for address generation that uses $2^{scale}*$index+base).

Displacement Field 1062A—its content is used as part of memory address generation (e.g., for address generation that uses $2^{scale}*$index+base+displacement).

Displacement Factor Field 1062B (note that the juxtaposition of displacement field 1062A directly over displacement factor field 1062B indicates one or the other is used)—its content is used as part of address generation; it specifies a displacement factor that is to be scaled by the size of a memory access (N)—where N is the number of bytes in the memory access (e.g., for address generation that uses $2^{scale}*$index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 1074 (described later herein) and the data manipulation field 1054C. The displacement field 1062A and the displacement factor field 1062B are optional in the sense that they are not used for the no memory access 1005 instruction templates and/or different embodiments may implement only one or none of the two.

Data element width field 1064—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 1070—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 1070 allows for partial vector operations, including loads, stores, arithmetic, logical, etc. While embodiments of the invention are described in which the write mask field's 1070 content selects one of a number of write mask registers that contains the write mask to be used (and thus the write mask field's 1070 content indirectly identifies that masking to be performed), alternative embodiments instead or additional allow the mask write field's 1070 content to directly specify the masking to be performed.

Immediate field 1072—its content allows for the specification of an immediate. This field is optional in the sense that is it not present in an implementation of the generic vector friendly format that does not support immediate and it is not present in instructions that do not use an immediate.

Class field 1068—its content distinguishes between different classes of instructions. With reference to FIGS. 12A-12B, the contents of this field select between class A and class B instructions. In FIGS. 12A-12B, rounded corner squares are used to indicate a specific value is present in a field (e.g., class A 1068A and class B 1068B for the class field 1068 respectively in FIGS. 12A-12B).

Instruction Templates of Class A

In the case of the non-memory access 1005 instruction templates of class A, the alpha field 1052 is interpreted as an RS field 1052A, whose content distinguishes which one of the different augmentation operation types are to be performed (e.g., round 1052A.1 and data transform 1052A.2 are respectively specified for the no memory access, round type operation 1010 and the no memory access, data transform type operation 1015 instruction templates), while the beta field 1054 distinguishes which of the operations of the specified type is to be performed. In the no memory access 1005 instruction templates, the scale field 1060, the displacement field 1062A, and the displacement scale filed 1062B are not present.

No-Memory Access Instruction Templates—Full Round Control Type Operation

In the no memory access full round control type operation 1010 instruction template, the beta field 1054 is interpreted as a round control field 1054A, whose content(s) provide static rounding. While in the described embodiments of the invention the round control field 1054A includes a suppress all floating point exceptions (SAE) field 1056 and a round operation control field 1058, alternative embodiments may support may encode both these concepts into the same field or only have one or the other of these concepts/fields (e.g., may have only the round operation control field 1058).

SAE field 1056—its content distinguishes whether or not to disable the exception event reporting; when the SAE field's 1056 content indicates suppression is enabled, a given instruction does not report any kind of floating-point exception flag and does not raise any floating point exception handler.

Round operation control field 1058—its content distinguishes which one of a group of rounding operations to perform (e.g., Round-up, Round-down, Round-towards-zero and Round-to-nearest). Thus, the round operation control field 1058 allows for the changing of the rounding mode on a per instruction basis. In one embodiment of the invention where a processor includes a control register for specifying rounding modes, the round operation control field's 1050 content overrides that register value.

No Memory Access instruction Templates—Data Transform Type Operation

In the no memory access data transform type operation 1015 instruction template, the beta field 1054 is interpreted as a data transform field 1054B, whose content distinguishes which one of a number of data transforms is to be performed (e.g., no data transform, swizzle, broadcast).

In the case of a memory access 1020 instruction template of class A, the alpha field 1052 is interpreted as an eviction hint field 1052B, whose content distinguishes which one of the eviction hints is to be used (in FIG. 12A, temporal 1052B.1 and non-temporal 1052B.2 are respectively specified for the memory access, temporal 1025 instruction template and the memory access, non-temporal 1030 instruction template), while the beta field 1054 is interpreted as a data manipulation field 1054C, whose content distinguishes which one of a number of data manipulation operations (also known as primitives) is to be performed (e.g., no manipulation; broadcast; up conversion of a source; and down conversion of a destination). The memory access 1020 instruction templates include the scale field 1060, and optionally the displacement field 1062A or the displacement scale field 1062B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 1052 is interpreted as a write mask control (Z) field 1052C, whose content distinguishes whether the write masking controlled by the write mask field 1070 should be a merging or a zeroing.

In the case of the non-memory access 1005 instruction templates of class B, part of the beta field 1054 is interpreted as an RL field 1057A, whose content distinguishes which one of the different augmentation operation types are to be performed (e.g., round 1057A.1 and vector length (VSIZE) 1057A.2 are respectively specified for the no memory access, write mask control, partial round control type operation 1012 instruction template and the no memory access, write mask control, VSIZE type operation 1017 instruction template), while the rest of the beta field 1054 distinguishes which of the operations of the specified type is to be performed. In the no memory access 1005 instruction templates, the scale field 1060, the displacement field 1062A, and the displacement scale filed 1062B are not present.

In the no memory access, write mask control, partial round control type operation 1010 instruction template, the rest of the beta field 1054 is interpreted as a round operation field 1059A and exception event reporting is disabled (a given instruction does not report any kind of floating-point exception flag and does not raise any floating point exception handler).

Round operation control field 1059A just as round operation control field 1058, its content distinguishes which one of a group of rounding operations to perform (e.g., Round-up, Round-down, Round-towards-zero and Round-to-nearest). Thus, the round operation control field 1059A allows for the changing of the rounding mode on a per instruction basis. In one embodiment of the invention where a processor includes a control register for specifying rounding modes, the round operation control field's 1050 content overrides that register value.

In the no memory access, write mask control, VSIZE type operation 1017 instruction template, the rest of the beta field 1054 is interpreted as a vector length field 1059B, whose content distinguishes which one of a number of data vector lengths is to be performed on (e.g., 128, 256, or 512 byte).

In the case of a memory access 1020 instruction template of class B, part of the beta field 1054 is interpreted as a broadcast field 1057B, whose content distinguishes whether or not the broadcast type data manipulation operation is to be performed, while the rest of the beta field 1054 is interpreted the vector length field 1059B. The memory access 1020 instruction templates include the scale field 1060, and optionally the displacement field 1062A or the displacement scale field 1062B.

With regard to the generic vector friendly instruction format 1000, a full opcode field 1074 is shown including the format field 1040, the base operation field 1042, and the data element width field 1064. While one embodiment is shown where the full opcode field 1074 includes all of these fields, the full opcode field 1074 includes less than all of these fields in embodiments that do not support all of them. The full opcode field 1074 provides the operation code (opcode).

The augmentation operation field 1050, the data element width field 1064, and the write mask field 1070 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 13 is a block diagram illustrating an exemplary specific vector friendly instruction format according to embodiments of the invention. FIG. 13A shows a specific vector friendly instruction format 1100 that is specific in the sense that it specifies the location, size, interpretation, and order of the fields, as well as values for some of those fields. The specific vector friendly instruction format 1100 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 12 into which the fields from FIG. 13 map are illustrated.

It should be understood that, although embodiments of the invention are described with reference to the specific vector friendly instruction format 1100 in the context of the generic vector friendly instruction format 1000 for illustrative purposes, the invention is not limited to the specific vector friendly instruction format 1100 except where claimed. For example, the generic vector friendly instruction format 1000 contemplates a variety of possible sizes for the various fields, while the specific vector friendly instruction format 1100 is shown as having fields of specific sizes. By way of specific example, while the data element width field 1064 is illustrated as a one hit field in the specific vector friendly instruction format 1100, the invention is not so limited (that is, the generic vector friendly instruction format 1000 contemplates other sizes of the data element width field 1064).

Figure 13A:
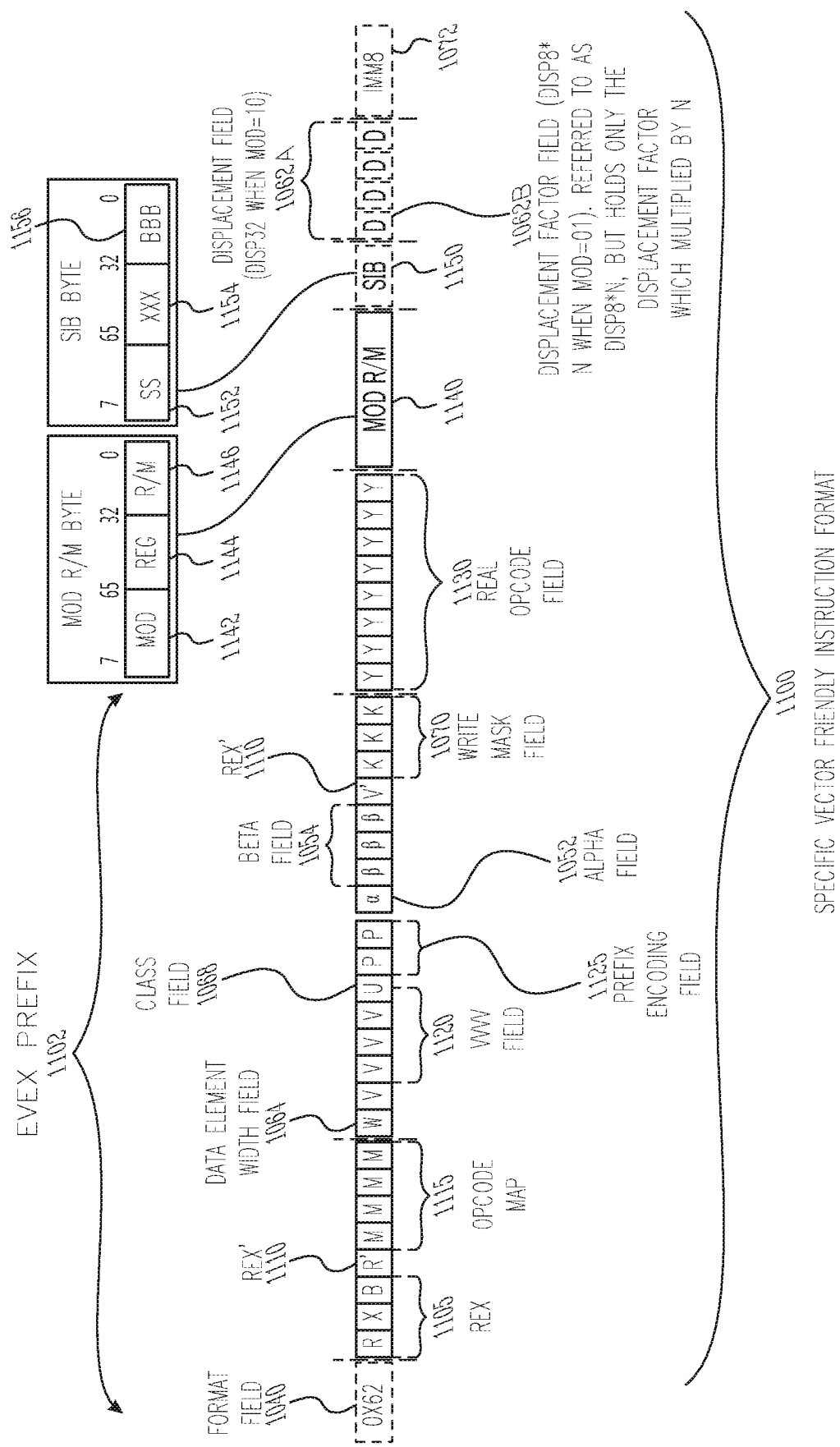
FIGS. 13A-13D are block diagrams illustrating an exemplary specific vector friendly instruction format according to some embodiments.

The generic vector friendly instruction format 1000 includes the following fields listed below in the order illustrated in FIG. 13A.

EVEX Prefix (Bytes 0-3) 1102—is encoded in a four-byte form.

Format Field 1040 (EVEX Byte 0, bits [7:0])—the first byte (EWA Byte 0) is the format field 1040 and it contains 0x62 (the unique value used for distinguishing the vector friendly instruction format in one embodiment of the invention).

The second-fourth bytes (EVEX Bytes 1-3) include a number of bit fields providing specific capability.

REX field 1105 (EVEX Byte 1, bits [7-5])—consists of a EVEX.R bit field (EVEX Byte 1, bit [7]—R), EVEX.X bit field (EVEX byte 1, bit [6]—X), and 1057BEX byte 1, bit[5]—B). The EVEX.R, EVEX.X, and EVEX.B bit fields provide the same functionality as the corresponding VEX bit fields, and are encoded using is complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X and ENTEX.B.

REX' field 1010—this is the first part of the REX' field 1010 and is the EVEX.R' bit field (EVEX Byte 1, bit [4]—R') that is used to encode either the upper 16 or lower 16 of the extended 32 register set. In one embodiment of the invention, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the invention do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 1115 (EVEX byte 1, bits [3:0]—mmmm)—its content encodes an implied leading opcode byte (0F, 0F 38, or 0F 3).

Data element width field 1064 (EN/EX byte 2, bit [7]—W)—is represented by the notation EVEX.W. EVEX.W is used to define the granularity (size) of the datatype (either 32-bit data elements or 64-bit data elements).

EVEX.vvvv 1120 (EVEX Byte 2, bits [6:3]—vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in is complement form for certain vector shifts; or 3) EVEX.vvvv does not encode any operand, the field is reserved and should contain 1111b. Thus, EVEX.vvvv field 1120 encodes the 4 low-order bits of the first source register specifier stored in inverted (1s complement) form. Depending on the instruction, an extra different EVEX bit field is used to extend the specifier size to 32 registers.

EVEX.U 1068 Class field (EVEX byte 2, bit [2]—U)—If EVEX.U=0, it indicates class A or EVEX.U0; if EVEX.U=1, it indicates class B or EVEX.U1.

Prefix encoding field 1125 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in bath the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 1052 (EVEX byte 3, bit [7] EH; also known as EVEX.EH, EVEX.rs, EVEX.RL, EVEX.write mask control, and EVEX.N; also illustrated with α)—as previously described, this field is context specific.

Beta field 1054 (EVEX byte 3, bits [6:4]-SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' field 1010—this is the remainder of the REX' field and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 1070 (EVEX byte 3, bits [2:0]-kkk) its content specifies the index of a register in the write mask registers as previously described. In one embodiment of the invention, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 1130 (Byte 4) is also known as the opcode byte. Part of the opcode is specified in this field.

MOD R/M Field 1140 (Byte 5) includes MOD field 1142, Reg field 1144, and R/M field 1146. As previously described, the MOD field's 1142 content distinguishes between memory access and non-memory access operations. The role of Reg field 1144 can be summarized to two situations: encoding either the destination register operand or a source register operand, or be treated as an opcode extension and not used to encode any instruction operand. The role of R/M field 1146 may include the following: encoding the instruction operand that references a memory address, or encoding either the destination register operand or a source register operand.

Scale, Index, Base (SIB) Byte (Byte 6)—As previously described, the scale field's 1050 content is used for memory address generation. SIB.xxx 1154 and SIB.bbb 1156—the contents of these fields have been previously referred to with regard to the register indexes Xxxx and Bbbb.

Displacement field 1062A (Bytes 7-10)—when MOD field 1142 contains 10, bytes 7-10 are the displacement field 1062A, and it works the same as the legacy 32-bit displacement (disp32) and works at byte granularity.

Displacement factor field 1062B (Byte 7)—when MOD field 1142 contains 01, byte 7 is the displacement factor field 1062B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 1062B is a reinterpretation of disp8; when using displacement factor field 1062B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 10628 substitutes the legacy x86 instruction set 8-bit displacement. Thus, the displacement factor field 1062B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 1072 operates as previously described.

Full Opeode Field

Figure 13B:
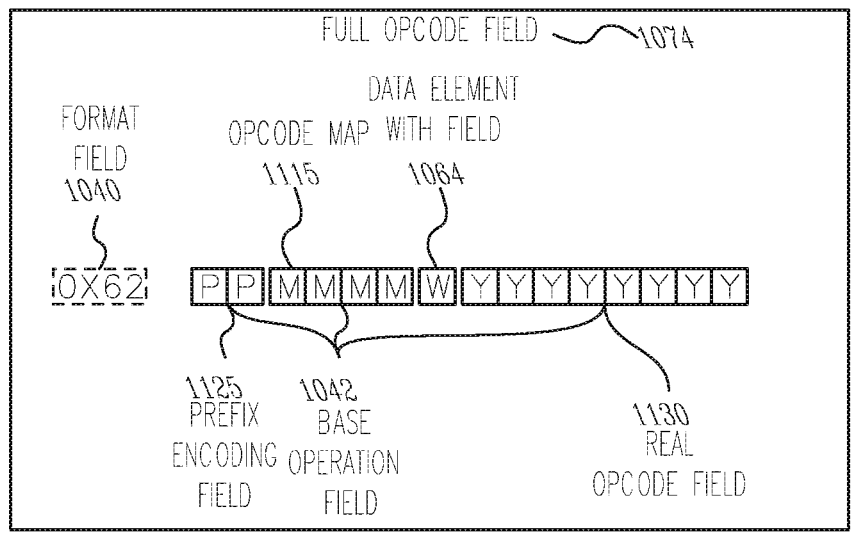

FIG. 13B is a block diagram illustrating the fields of the specific vector friendly instruction format 1100 that make up the full opcode field 1074 according to one embodiment of the invention. Specifically, the full opcode field 1074 includes the format field 1040, the base operation field 1042, and the data element width (W) field 1064. The base operation field 1042 includes the prefix encoding field 1125, the opcode map field 1115, and the real opcode field 1130.

Register Index Field

Figure 13C:
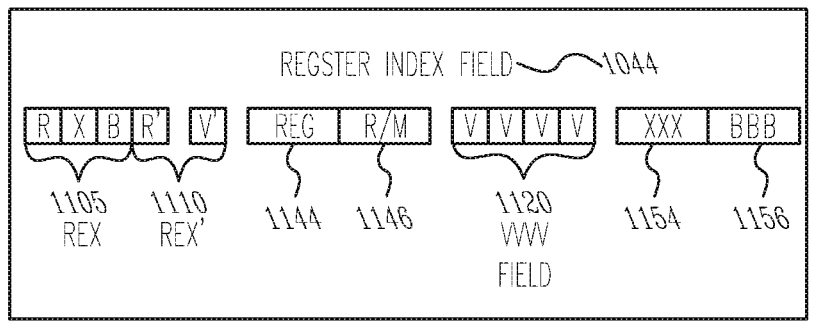

FIG. 13C is a block diagram illustrating the fields of the specific vector friendly instruction format 1100 that make up the register index field 1044 according to one embodiment of the invention. Specifically, the register index field 1044 includes the REX field 1105, the REX' field 1110, the MODR/M.reg field 1144, the MODR/M.r/m field 1146, the VVVV field 1120, xxx field 1154, and the bbb field 1156.

Augmentation Operation Field

Figure 13D:
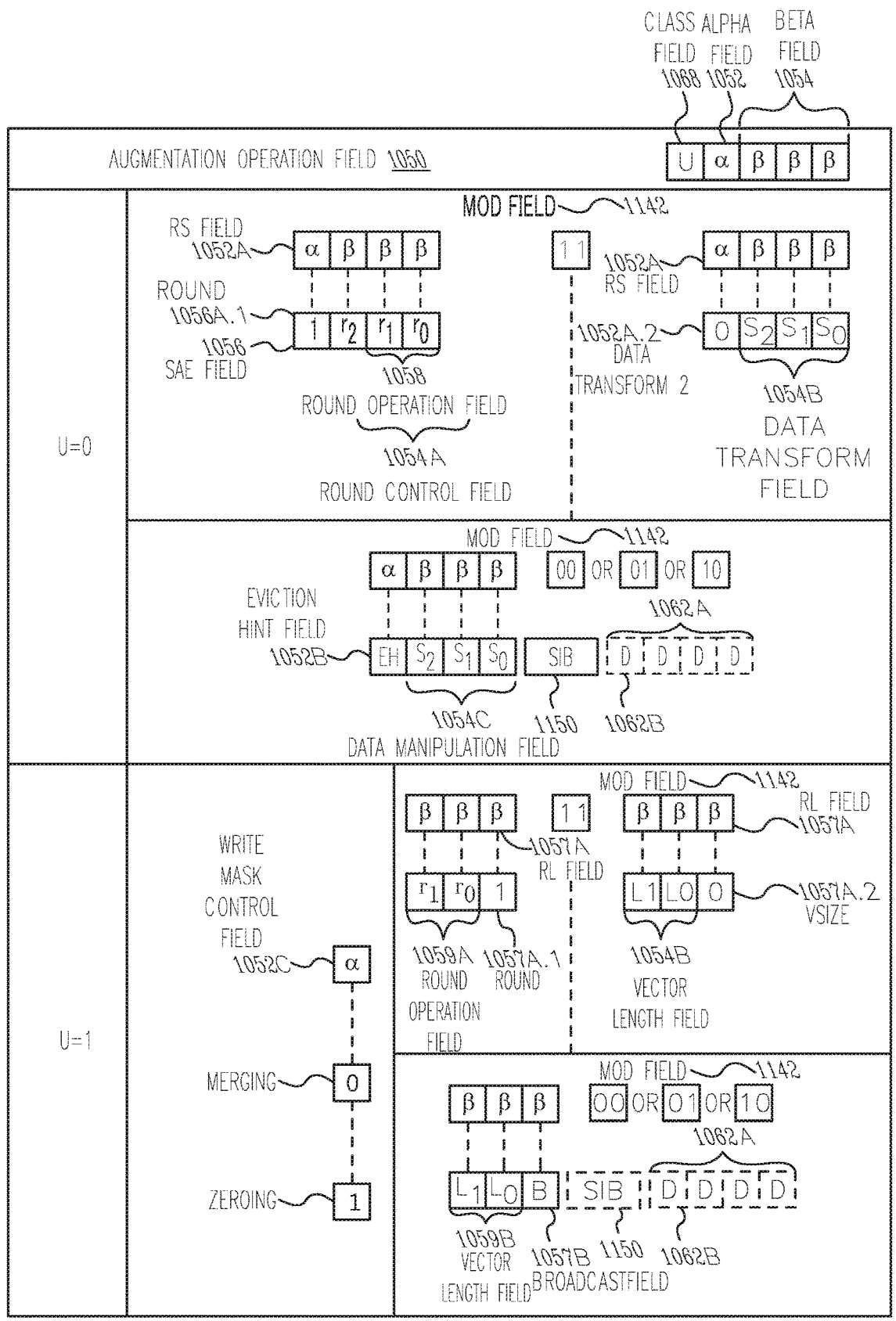

FIG. 13D is a block diagram illustrating the fields of the specific vector friendly instruction format 1100 that make up the augmentation operation field 1050 according to one embodiment of the invention. When the class (U) field 1068 contains 0, it signifies EVEX.U0 (class A 1068A); when it contains 1, it signifies EVEX.U1 (class B 1068B). When U=0 and the MOD field 1142 contains 11 (signifying a no memory access operation), the alpha field 1052 (EVEX byte 3, bit [7]—EH) is interpreted as the rs field 1052A. When the rs field 1052A contains a 1 (round 1052A.1), the beta field 1054 (EVEX byte 3, bits [6:4]—SSS) is interpreted as the round control field 1054A. The round control field 1054A includes a one bit SAE field 1056 and a two bit round operation field 1058. When the rs field 1052A contains a 0 (data transform 1052A.2), the beta field 1054 (EVEX byte 3, bits [6:4]—SSS) is interpreted as a three bit data transform field 1054B. When U=0 and the MOI) field 1142 contains 00, 01, or 10 (signifying a memory access operation), the alpha field 1052 (EVEX byte 3, bit [7]—EH) is interpreted as the eviction hint (ER) field 1052B and the beta field 1054 (ENTEX byte 3, bits [6:4]—SSS) is interpreted as a three bit data manipulation field 1054C.

When U=1, the alpha field 1052 (EVEX byte 3, bit [7]—EH) is interpreted as the write mask control (Z) field 1052C. When U=1 and the MOD field 1142 contains 11 (signifying a no memory access operation), part of the beta field 1054 (EVEX byte 3, bit [4]—$S_0$) is interpreted as the RL field 1057A; when it contains a 1 (round 1057A.1) the rest of the beta field 1054 (EVEX byte 3, bit [6-5]—$S_{2-1}$) is interpreted as the round operation field 1059A, while when the RL field 1057A contains a 0 (VSIZE 1057.A2) the rest of the beta field 1054 (EVEX byte 3, bit [6-5]—$S_{2-1}$) is interpreted as the vector length field 1059B (EVEX byte 3, bit [6-5]—$L_{1-0}$). When U=1 and the MOD field 1142 contains 00, 01, or 10 (signifying a memory access operation), the beta field 1054 (EVEX byte 3, bits [6:4]—SSS) is interpreted as the vector length field 1059B (EVEX byte 3, bit [6-5]—$L_{1-0}$) and the broadcast field 1057B (EVEX byte 3, bit [4]—B).

Exemplary Register Architecture

Figure 14:
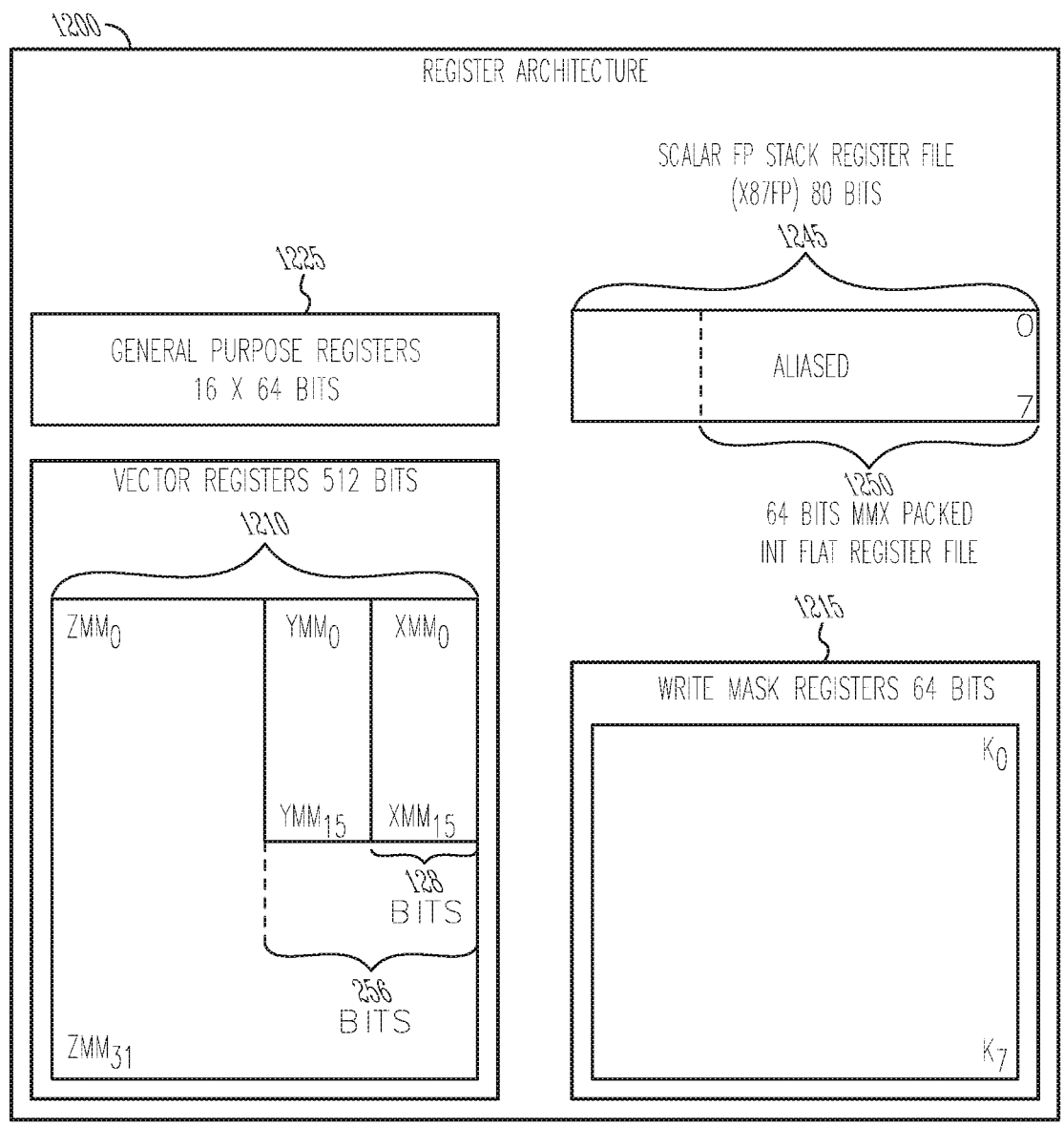
FIG. 14 is a block diagram of a register architecture according to some embodiments.

FIG. 14 is a block diagram of a register architecture 1200 according to one embodiment of the invention. In the embodiment illustrated, there are 32 vector registers 1210 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 1100 operates on these overlaid register file as illustrated in the below tables.

| Adjustable Vector Length | Class | Operations | Registers |
|---|---|---|---|
| Instruction Templates that do not include the vector length field 1059B | A (FIG. 12A; U = 0) | 1010, 1015, 1025, 1030 | zmm registers (the vector length is 64 byte) |
| | B (FIG. 12B; U = 1) | 1012 | zmm registers (the vector length is 64 byte) |
| Instruction templates that do include the vector length field 1059B | B (FIG. 12B; U = 1) | 1017, 1027 | zmm, ymm, or xmm registers (the vector length is 64 byte, 32 byte, or 16 byte) depending on the vector length field 1059B |

In other words, the vector length field 1059B selects between a maximum length and one or more other shorter lengths, where each such shorter length is half the length of the preceding length; and instructions templates without the vector length field 1059B operate on the maximum vector length. Further, in one embodiment, the class B instruction templates of the specific vector friendly instruction format 1100 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 1215—in the embodiment illustrated, there are 8 write mask registers (k0 through k7), each 64 bits in size. In an alternate embodiment, the write mask registers 1215 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 1225—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1245, on which is aliased the MMX packed integer flat register file 1250—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

Figure 15A:
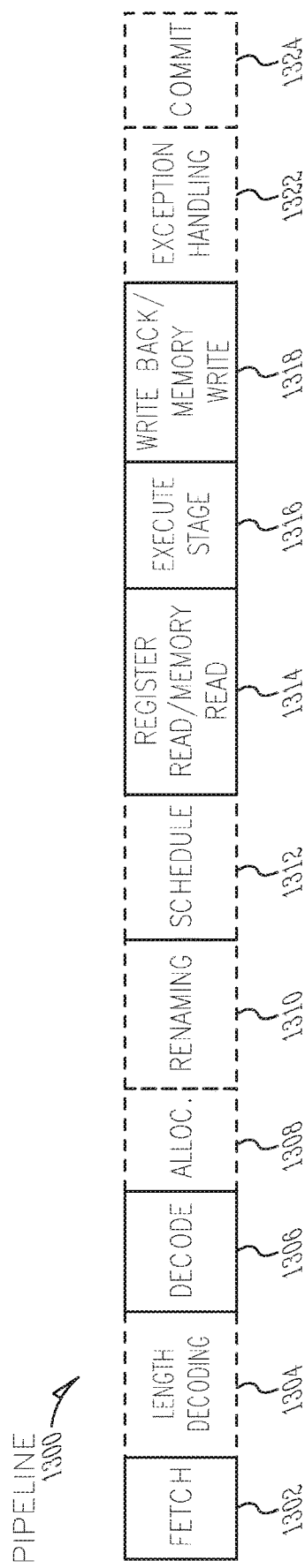
FIG. 15A is a block diagram illustrating both an exemplary in-order pipeline and an exemplary register renaming, out-of-order issue/execution pipeline according to some embodiments.
Figure 15B:
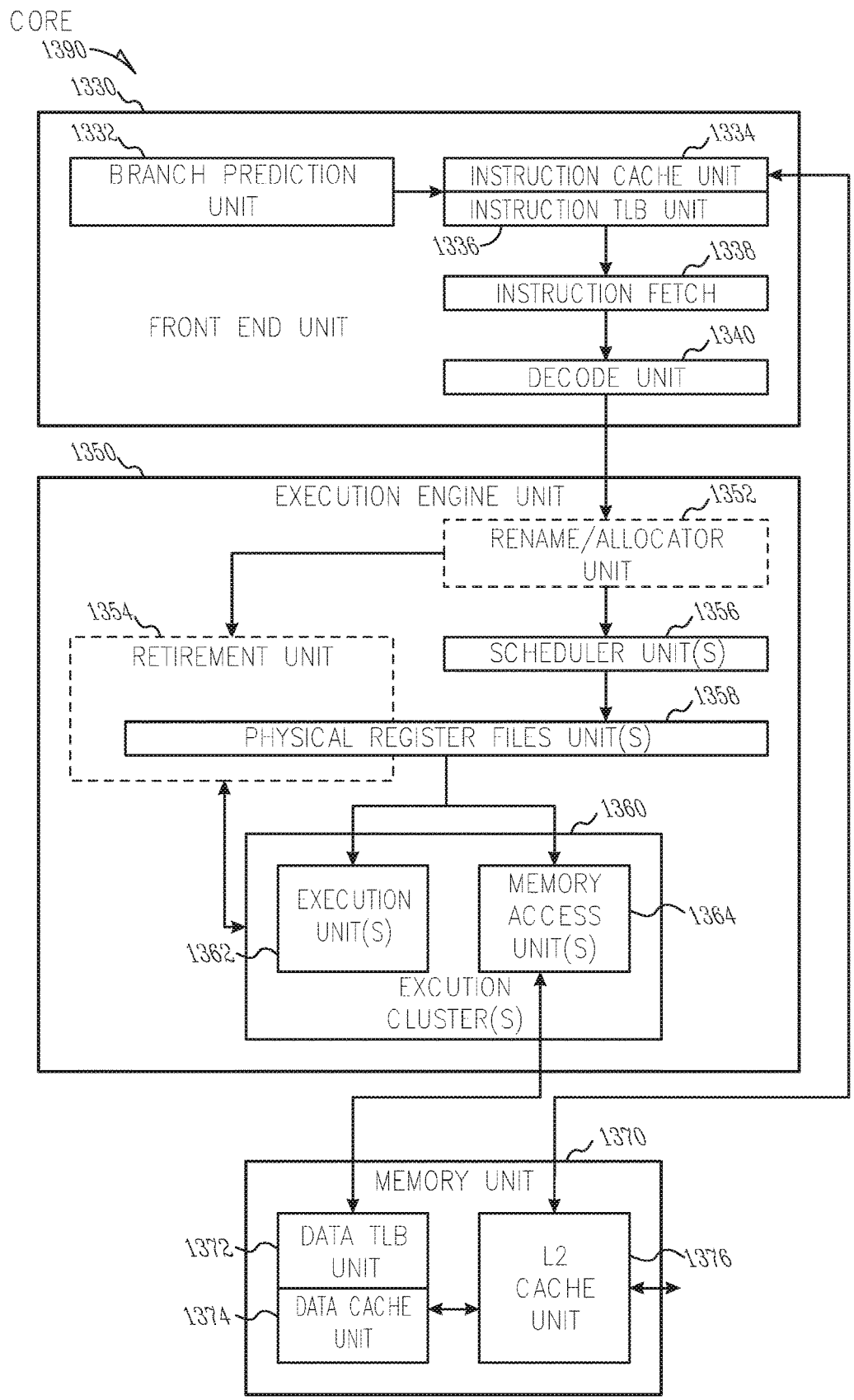
FIG. 15B is a block diagram illustrating both an exemplary embodiment of an in-order architecture core and an exemplary register renaming, out-of-order issue/execution architecture core to be included in a processor according to some embodiments.

FIG. 15A is a block diagram illustrating both an exemplary in-order pipeline and an exemplary register renaming, out-of-order issue/execution pipeline according to embodiments of the invention. FIG. 15B is a block diagram illustrating both an exemplary embodiment of an in-order architecture core and an exemplary register renaming, out-of-order issue/execution architecture core to be included in a processor according to embodiments of the invention. The solid lined boxes in FIGS. 15A-15B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 15A, a processor pipeline 1300 includes a fetch stage 1302, a length decode stage 1304, a decode stage 1306, an allocation stage 1308, a renaming stage 1310, a scheduling (also known as a dispatch or issue) stage 1312, a register read/memory read stage 1314, an execute stage 1316, a write back/memory write stage 1318, an exception handling stage 1322, and a commit stage 1324.

FIG. 15B shows processor core 1390 including a front end unit 1330 coupled to an execution engine unit 1350, and both are coupled to a memory unit 1370. The core 1390 may be a reduced instruction set computing (RISC) core, a complex instruction set computing (CISC) core, a very long instruction word (VLIW) core, or a hybrid or alternative core type. As yet another option, the core 1390 may be a special-purpose core, such as, for example, a network or communication core, compression engine, coprocessor core, general purpose computing graphics processing unit (GPGPU) core, graphics core, or the like.

The front end unit 1330 includes a branch prediction unit 1332 coupled to an instruction cache unit 1334, which is coupled to an instruction translation lookaside buffer (TLB) 1336, which is coupled to an instruction fetch unit 1338, which is coupled to a decode unit 1340. The decode unit 1340 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1340 may be implemented using various different mechanisms. Examples of suitable mechanisms include, but are not limited to, look-up tables, hardware implementations, programmable logic arrays (PLAs), microcode read only memories (ROMS), etc. In one embodiment, the core 1390 includes a microcode ROM or other medium that stores microcode for certain macroinstructions (e.g., in decode unit 1340 or otherwise within the front end unit 1330). The decode unit 1340 is coupled to a rename/allocator unit 1352 in the execution engine unit 1350.

The execution engine unit 1350 includes the rename/allocator unit 1352 coupled to a retirement unit 1354 and a set of one or more scheduler unit(s) 1356. The scheduler unit(s) 1356 represents any number of different schedulers, including reservations stations, central instruction window, etc. The scheduler unit(s) 1356 is coupled to the physical register file(s) unit(s) 1358. Each of the physical register file(s) units 1358 represents one or more physical register files, different ones of which store one or more different data types, such as scalar integer, scalar floating point, packed integer, packed floating point, vector integer, vector floating point status (e.g., an instruction pointer that is the address of the next instruction to be executed), etc. In one embodiment, the physical register file(s) unit 1358 comprises a vector registers unit, a write mask registers unit, and a scalar registers unit. These register units may provide architectural vector registers, vector mask registers, and general purpose registers. The physical register file(s) unit(s) 1358 is overlapped by the retirement unit 1354 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1354 and the physical register file(s) unit(s) 1358 are coupled to the execution cluster(s) 1360. The execution cluster(s) 1360 includes a set of one or more execution units 1362 and a set of one or more memory access units 1364. The execution units 1362 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1356, physical register file(s) unit(s) 1358, and execution cluster(s) 1360 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster and in the case of a separate memory access pipeline, certain embodiments are implemented in which only the execution cluster of this pipeline has the memory access unit(s) 1364). It should also be understood that where separate pipelines are used, one or more of these pipelines may be out-oft order issue/execution and the rest in-order.

The set of memory access units 1364 is coupled to the memory unit 1370, which includes a data TLB unit 1372 coupled to a data cache unit 1374 coupled to a level 2 (L2) cache unit 1376. In one exemplary embodiment, the memory access units 1364 may include a load unit, a store address unit, and a store data unit, each of which is coupled to the data TLB unit 1372 in the memory unit 1370. The instruction cache unit 1334 is further coupled to a level 2 (L2) cache unit 1376 in the memory unit 1370. The L2 cache unit 1376 is coupled to one or more other levels of cache and eventually to a main memory.

By way of example, the exemplary register renaming, out-of-order issue/execution core architecture may implement the pipeline 1300 as follows: 1) the instruction fetch 1338 performs the fetch and length decoding stages 1302 and 1304; 2) the decode unit 1340 performs the decode stage 1306; 3) the rename/allocator unit 1352 performs the allocation stage 1308 and renaming stage 1310; 4) the scheduler unit(s) 1356 performs the schedule stage 1312; 5) the physical register file(s) unit(s) 1358 and the memory unit 1370 perform the register read/memory read stage 1314; the execution cluster 1360 perform the execute stage 1316; 6) the memory unit 1370 and the physical register file(s) unit(s) 1358 perform the write back/memory write stage 1318; 7) various units may be involved in the exception handling stage 1322; and 8) the retirement unit 1354 and the physical register file(s) unit(s) 1358 perform the commit stage 1324.

The core 1390 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1390 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1334/1374 and a shared L2 cache unit 1376, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 16B:
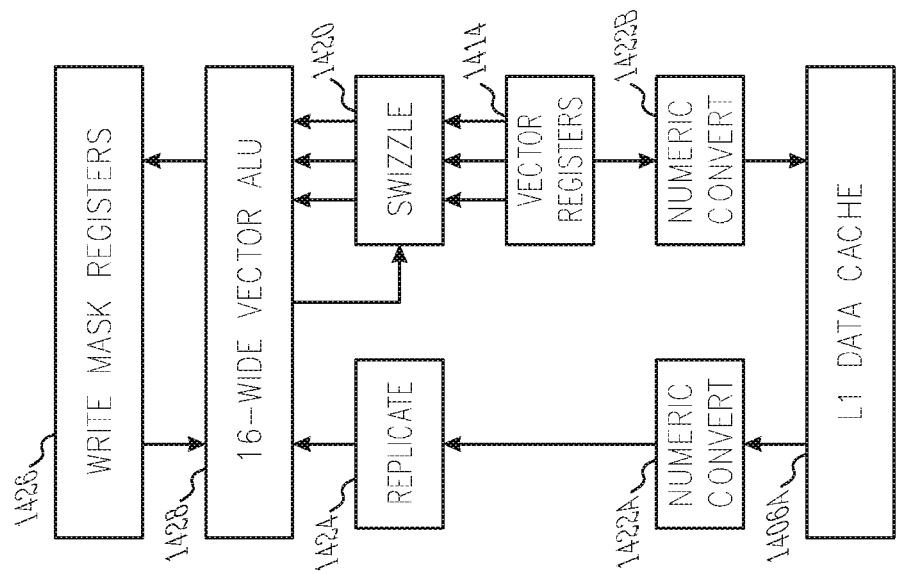
FIGS. 16A-16B illustrate a block diagram of a more specific exemplary in-order core architecture, which core would be one of several logic blocks (including other cores of the same type and/or different types) in a chip.
Figure 16A:
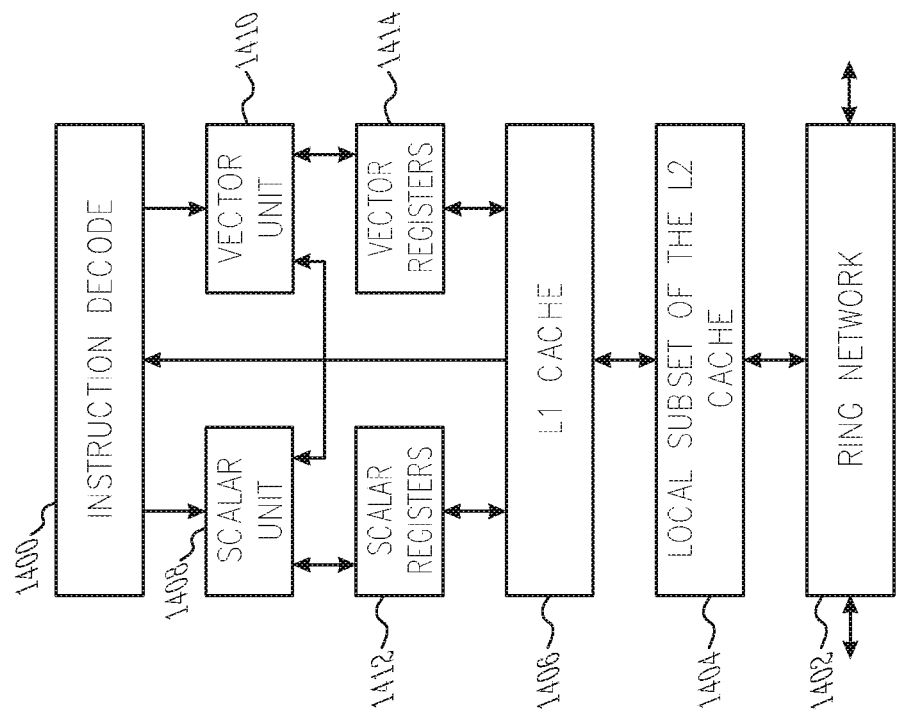

FIGS. 16A-16B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 16A is a block diagram of a single processor core, along with its connection to the on-die interconnect network 1402 and with its local subset of the Level 2 (L2) cache 1404, according to embodiments of the invention. In one embodiment, an instruction decoder 1400 supports the x86 instruction set with a packed data instruction set extension. An L1 cache 1406 allows low-latency accesses to cache memory into the scalar and vector units. While in one embodiment (to simplify the design), a scalar unit 1408 and a vector unit 1410 use separate register sets (respectively, scalar registers 1412 and vector registers 1414) and data transferred between them is written to memory and then read back in from a level 1 (L1) cache 1406, alternative embodiments of the invention may use a different approach (e.g., use a single register set or include a communication path that allow data to be transferred between the two register files without being written and read back).

The local subset of the L2 cache 1404 is part of a global L2 cache that is divided into separate local subsets, one per processor core. Each processor core has a direct access path to its own local subset of the L2 cache 1404. Data read by a processor core is stored in its L2 cache subset 1404 and can be accessed quickly, in parallel with other processor cores accessing their own local L2 cache subsets. Data written by a processor core is stored in its own L2 cache subset 1404 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 16B is an expanded view of part of the processor core in FIG. 16A according to embodiments of the invention. FIG. 16B includes an L1 data cache 1406A part of the L1 cache 1404, as well as more detail regarding the vector unit 1410 and the vector registers 1414. Specifically, the vector unit 1410 is a 16-wide vector processing unit (VPU) (see the 16-wide ALU 1428), which executes one or more of integer, single-precision float, and double-precision float instructions. The VPU supports swizzling the register inputs with swizzle unit 1420, numeric conversion with numeric convert units 1422A-B, and replication with replication unit 1424 on the memory input. Write mask registers 1426 allow predicating resulting vector writes.

Figure 17:
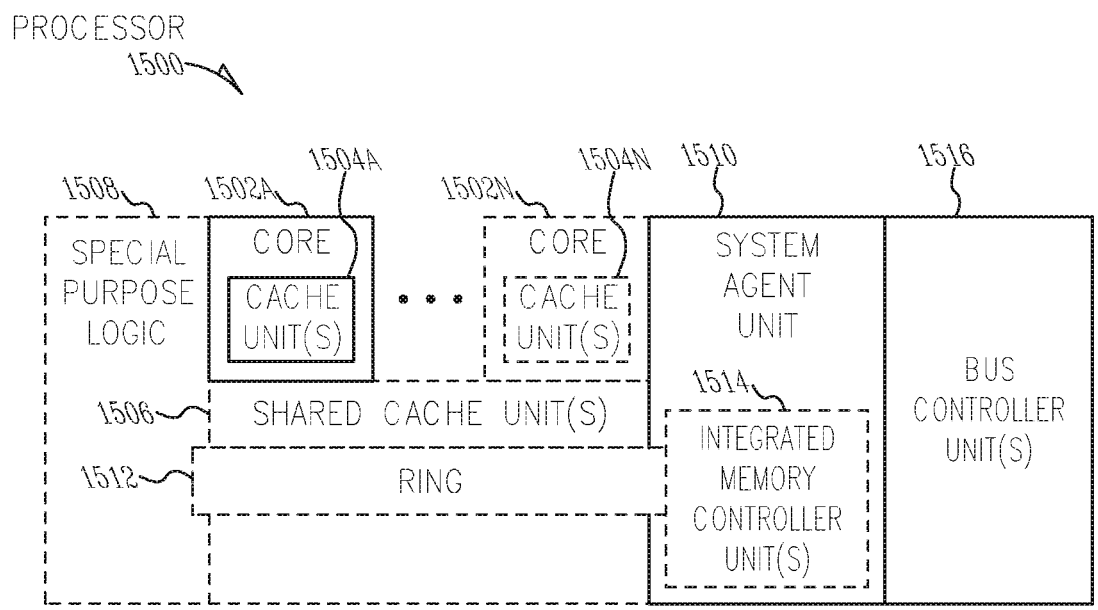
FIG. 17 is a block diagram of a processor that may have more than one core, may have an integrated memory controller, and may have integrated graphics according to some embodiments.

FIG. 17 is a block diagram of a processor 1500 that may have more than one core, may have an integrated memory controller, and may have integrated graphics according to embodiments of the invention. The solid lined boxes in FIG. 17 illustrate a processor 1500 with a single core 1502A, a system agent 1510, a set of one or more bus controller units 1516, while the optional addition of the dashed lined boxes illustrates an alternative processor 1500 with multiple cores 1502A-N, a set of one or more integrated memory controller unit(s) 1514 in the system agent unit 1510, and special purpose logic 1508.

Thus, different implementations of the processor 1500 may include: 1) a CPU with the special purpose logic 1508 being integrated graphics and/or scientific (throughput) logic (which may include one or more cores), and the cores 1502A-N being one or more general purpose cores (e.g., general purpose in-order cores, general purpose out-of-order cores, a combination of the two); 2) a coprocessor with the cores 1502A-N being a large number of special purpose cores intended primarily for graphics and/or scientific (throughput); and 3) a coprocessor with the cores 1502A-N being a large number of general purpose in-order cores. Thus, the processor 1500 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1500 may be a part of and/or may be implemented on one or more substrates using any of a number of process technologies, such as, for example, BiCMOS, CMOS, or NMOS.

The memory hierarchy includes one or more levels of cache 1504A-N within the cores, a set or one or more shared cache units 1506, and external memory (not shown) coupled to the set of integrated memory controller units 1514. The set of shared cache units 1506 may include one or more mid-level caches, such as level 2 (L2), level 3 (L3), level 4 (L4), or other levels of cache, a last level cache (LLC), and/or combinations thereof. While in one embodiment a ring based interconnect unit 1512 interconnects the integrated graphics logic 1508, the set of shared cache units 1506, and the system agent unit 1510/integrated memory controller unit(s) 1514, alternative embodiments may use any number of well-known techniques for interconnecting such units. In one embodiment, coherency is maintained between one or more cache units 1506 and cores 1502A-N.

In some embodiments, one or more of the cores 1502A-N are capable of multi-threading. The system agent 1510 includes those components coordinating and operating cores 1502A-N. The system agent unit 1510 may include for example a power control unit (PCU) and a display unit. The PCU may be or include logic and components needed for regulating the power state of the cores 1502A-N and the integrated graphics logic 1508. The display unit is for driving one or more externally connected displays.

The cores 1502A-N may be homogenous or heterogeneous in terms of architecture instruction set; that is, two or more of the cores 1502A-N may be capable of execution the same instruction set, while others may be capable of executing only a subset of that instruction set or a different instruction set.

Exemplary Computer Architectures

Figure 18:
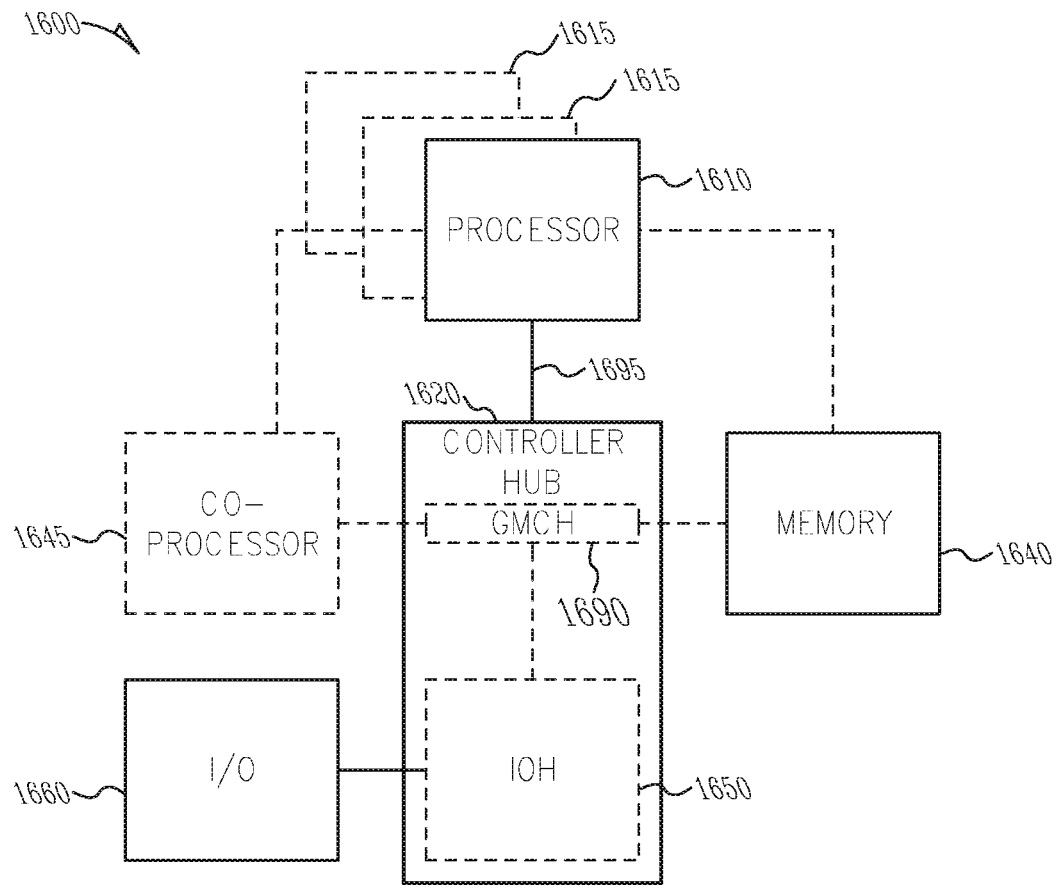
FIGS. 18-21 are block diagrams of example computer architectures.
Figure 19:
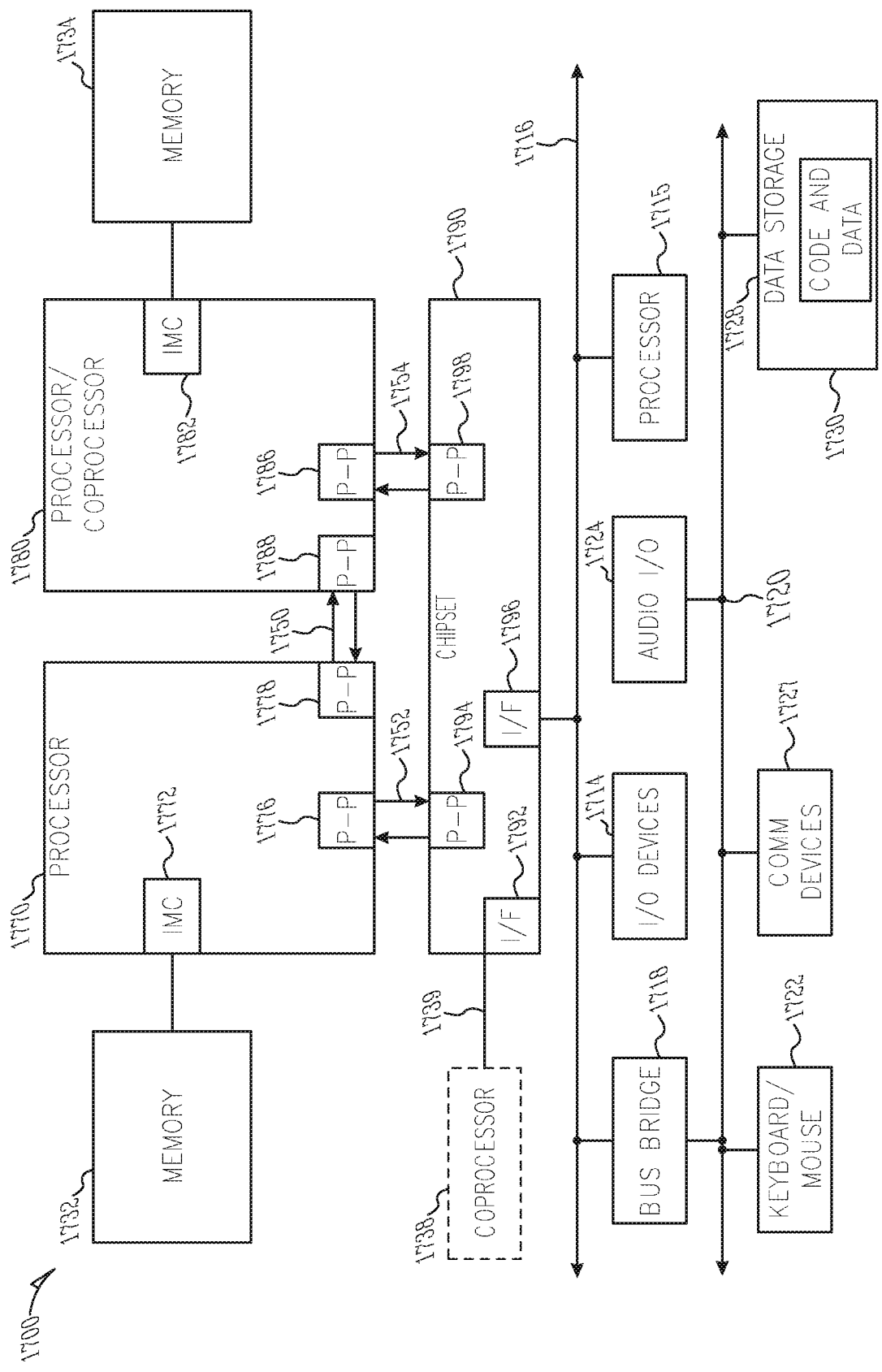
Figure 20:
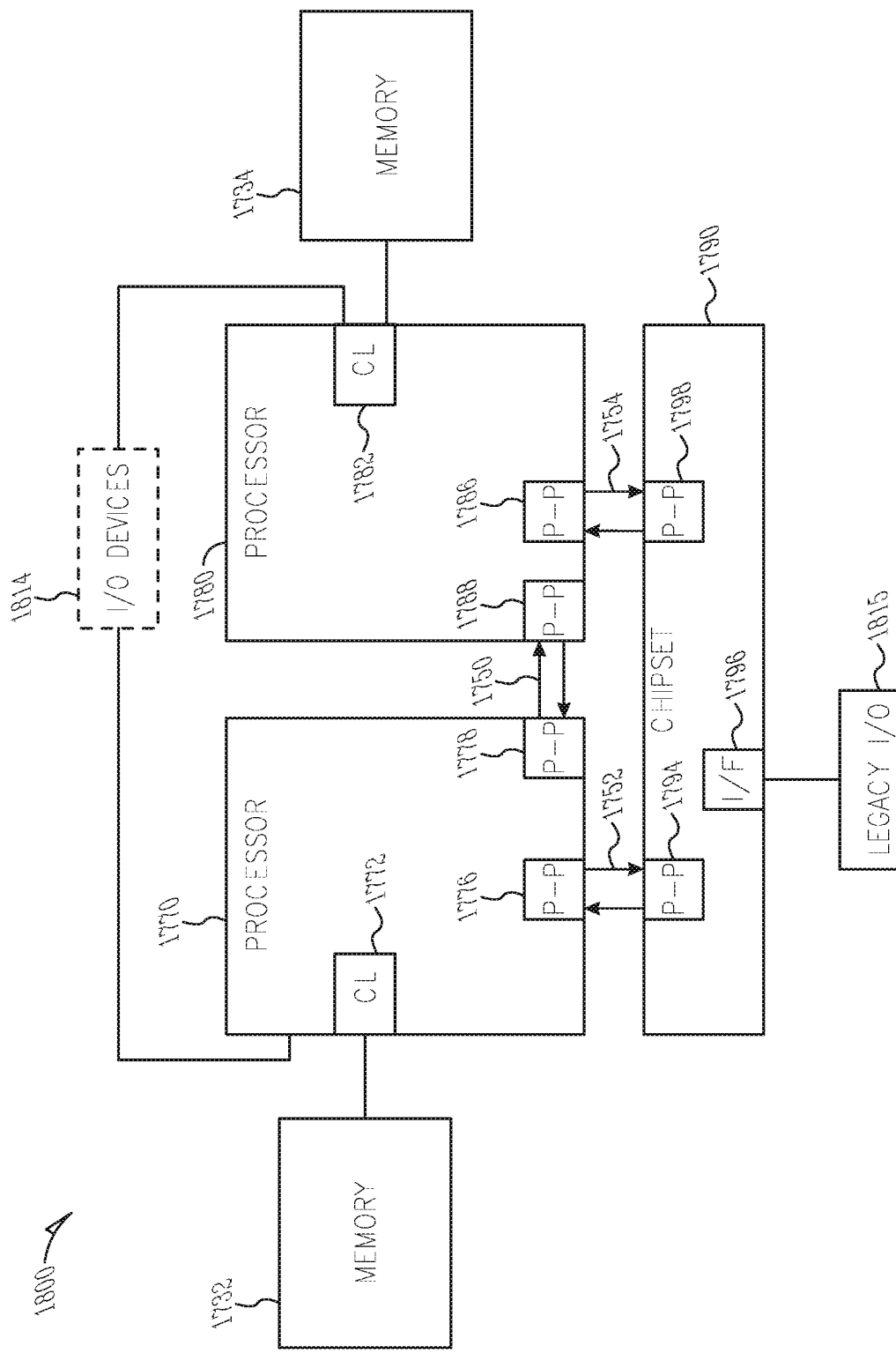

FIGS. 18-20 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Referring now to FIG. 18, shown is a block diagram of a system 1600 in accordance with one embodiment of the present invention. The system 1600 may include one or more processors 1610, 1615, which are coupled to a controller hub 1620. In one embodiment the controller hub 1620 includes a graphics memory controller hub (GMCH) 1690 and an Input/Output Hub (IOH) 1650 (which may be on separate chips); the GMCH 1690 includes memory and graphics controllers to which are coupled memory 1640 and a coprocessor 1645; the IOH 1650 is couples input/output (I/O) devices 1660 to the GMCH 1690. Alternatively, one or both of the memory and graphics controllers are integrated within the processor (as described herein), the memory 1640 and the coprocessor 1645 are coupled directly to the processor 1610, and the controller hub 1620 in a single chip with the IOH 1650.

The optional nature of additional processors 1615 is denoted in FIG. 18 with broken lines. Each processor 1610, 1615 may include one or more of the processing cores described herein and may be some version of the processor 1500.

The memory 1640 may be, for example, dynamic random access memory (DRAM), phase change memory (PCM), or a combination of the two. For at least one embodiment, the controller hub 1620 communicates with the processor(s) 1610, 1615 via a multi-drop bus, such as a frontside bus (FSB), point-to-point interface such as QuickPath Interconnect (QPI), or similar connection 1695.

In one embodiment, the coprocessor 1645 is a special-purpose processor, such as, for example, a high-throughput MIC processor, a network or communication processor, compression engine, graphics processor, GPGPU, embedded processor, or the like. In one embodiment, controller hub 1620 may include an integrated graphics accelerator.

There can be a variety of differences between the physical resources 1610, 1615 in terms of a spectrum of metrics of merit including architectural, microarchitectural, thermal, power consumption characteristics, and the like.

In one embodiment, the processor 1610 executes instructions that control data processing operations of a general type. Embedded within the instructions may be coprocessor instructions. The processor 1610 recognizes these coprocessor instructions as being of a type that should be executed by the attached coprocessor 1645. Accordingly, the processor 1610 issues these coprocessor instructions (or control signals representing coprocessor instructions) on a coprocessor bus or other interconnect, to coprocessor 1645. Coprocessor(s) 1645 accept and execute the received coprocessor instructions.

Referring now to FIG. 19, shown is a block diagram of a first more specific exemplary system 1700 in accordance with an embodiment of the present invention. As shown in FIG. 19, multiprocessor system 1700 is a point-to-point interconnect system, and includes a first processor 1770 and a second processor 1780 coupled via a point-to-point interconnect 1750. Each of processors 1770 and 1780 may be some version of the processor 1500. In one embodiment of the invention, processors 1770 and 1780 are respectively processors 1610 and 1615, while coprocessor 1738 is coprocessor 1645. In another embodiment, processors 1770 and 1780 are respectively processor 1610 coprocessor 1645.

Processors 1770 and 1780 are shown including integrated memory controller (IMC) units 1772 and 1782, respectively. Processor 1770 also includes as part of its bus controller units point-to-point (P-P) interfaces 1776 and 1778; similarly, second processor 1780 includes P-P interfaces 1786 and 1788. Processors 1770, 1780 may exchange information via a point-to-point (P-P) interface 1750 using P-P interface circuits 1778, 1788. As shown in FIG. 19, IMCs 1772 and 1782 couple the processors to respective memories, namely a memory 1732 and a memory 1734, which may be portions of main memory locally attached to the respective processors.

Processors 1770, 1780 may each exchange information with a chipset 1790 via individual P-P interfaces 1752, 1754 using point to point interface circuits 1776, 1794, 1786, 1798. Chipset 1790 may optionally exchange information with the coprocessor 1738 via a high-performance interface 1739. In one embodiment, the coprocessor 1738 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors local cache information may be stored in the shared cache if a processor is placed into a low power mode.

Chipset 1790 may be coupled to a first bus 1716 via an interface 1796. In one embodiment, first bus 1716 may be a Peripheral Component Interconnect (PCI) bus, or a bus such as a PCI Express bus or another third generation I/O interconnect bus, although the scope of the present invention is not so limited.

As shown in FIG. 19, various I/O devices 1714 may be coupled to first bus 1716, along with a bus bridge 1718 which couples first bus 1716 to a second bus 1720. In one embodiment, one or more additional processor(s) 1715, such as coprocessors, high-throughput MIC processors, GPGPU's, accelerators (such as, e.g., graphics accelerators or digital signal processing (DSP) units), field programmable gate arrays, or any other processor, are coupled to first bus 1716. In one embodiment, second bus 1720 may be a low pin count (LPC) bus. Various devices may be coupled to a second bus 1720 including, for example, a keyboard and/or mouse 1722, communication devices 1727 and a storage unit 1728 such as a disk drive or other mass storage device which may include instructions/code and data 1730, in one embodiment. Further, an audio I/O 1724 may be coupled to the second bus 1720. Note that other architectures are possible. For example, instead of the point-to-point architecture of FIG. 19, a system may implement a multi-drop bus or other such architecture.

Referring now to FIG. 20, shown is a block diagram of a second more specific exemplary system 1800 in accordance with an embodiment of the present invention. Like elements in FIGS. 17 and 18 bear like reference numerals, and certain aspects of FIG. 19 have been omitted from FIG. 20 in order to avoid obscuring other aspects of FIG. 20.

FIG. 20 illustrates that the processors 1770, 1780 may include integrated memory and I/O control logic ("CL") 1772 and 1782, respectively. Thus, the CL 1772, 1782 include integrated memory controller units and include I/O control logic. FIG. 20 illustrates that not only are the memories 1732, 1734 coupled to the CL 1772, 1782, but also that I/O devices 1814 are also coupled to the control logic 1772, 1782. Legacy I/O devices 1815 are coupled to the chipset 1790.

Figure 21:
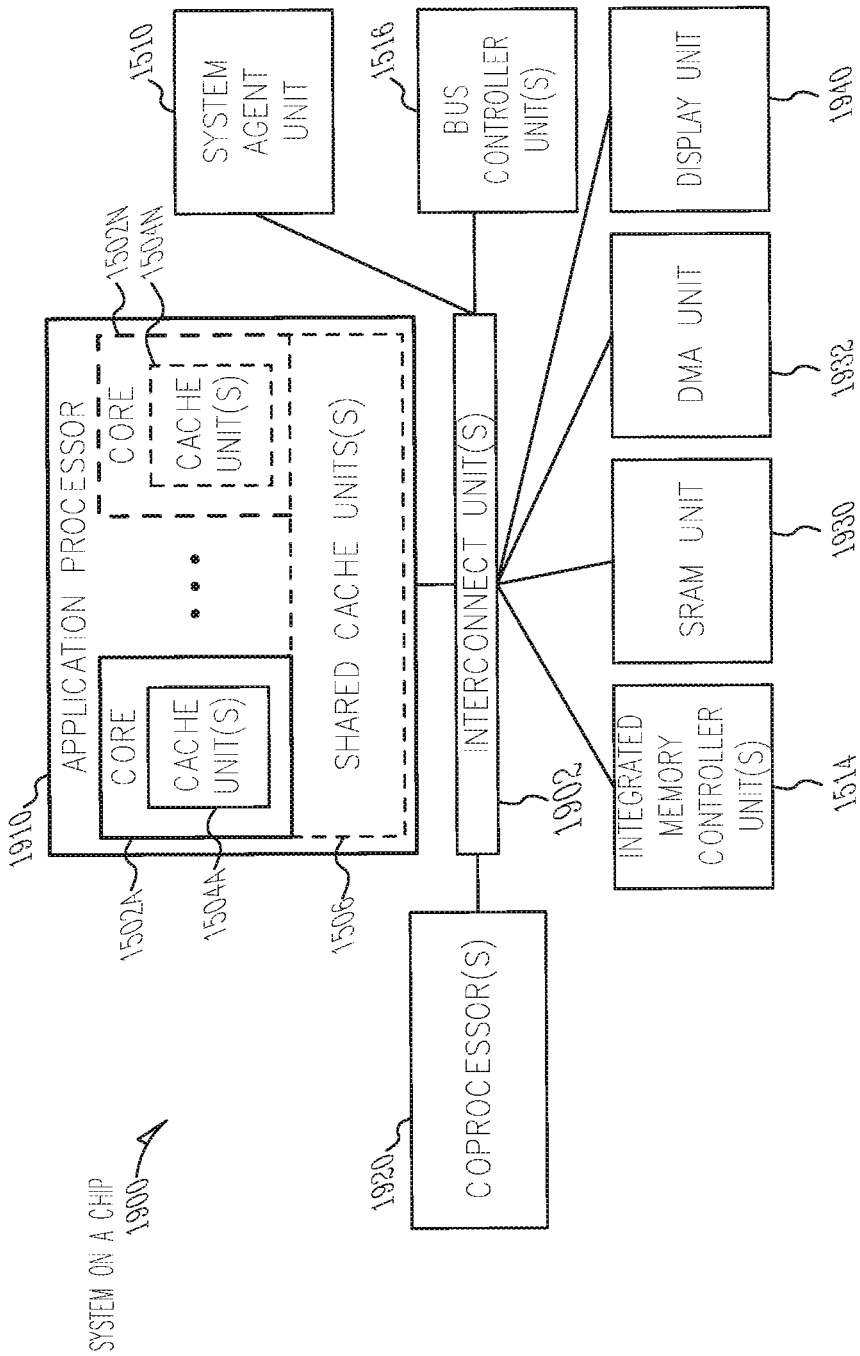

Referring now to FIG. 21, shown is a block diagram of a SoC 1900 in accordance with an embodiment of the present invention. Similar elements in FIG. 17 bear like reference numerals. Also, dashed lined boxes are optional features on more advanced SoCs. In FIG. 21, an interconnect unit(s) 1902 is coupled to: an application processor 1910 which includes a set of one or more cores 202A-N and shared cache unit(s) 1506; a system agent unit 1510; a bus controller unit(s) 1516; an integrated memory controller unit(s) 1514; a set or one or more coprocessors 1920 which may include integrated graphics logic, an image processor, an audio processor, and a video processor; an static random access memory (SRAM) unit 1930; a direct memory access (DMA) unit 1932; and a display unit 1940 for coupling to one or more external displays. In one embodiment, the coprocessor(s) 1920 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1730 illustrated in FIG. 19, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMS), compact disk rewritables (CD-RWs), and magneto-optical disks, semiconductor devices such as read-only memories (ROMS), random access memories (RAMS) such as dynamic random access memories (DRAMS), static random access memories (SRAMS), erasable programmable read-only memories (EPROMS), flash memories, electrically erasable programmable read-only memories (EEPROMS), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 22:
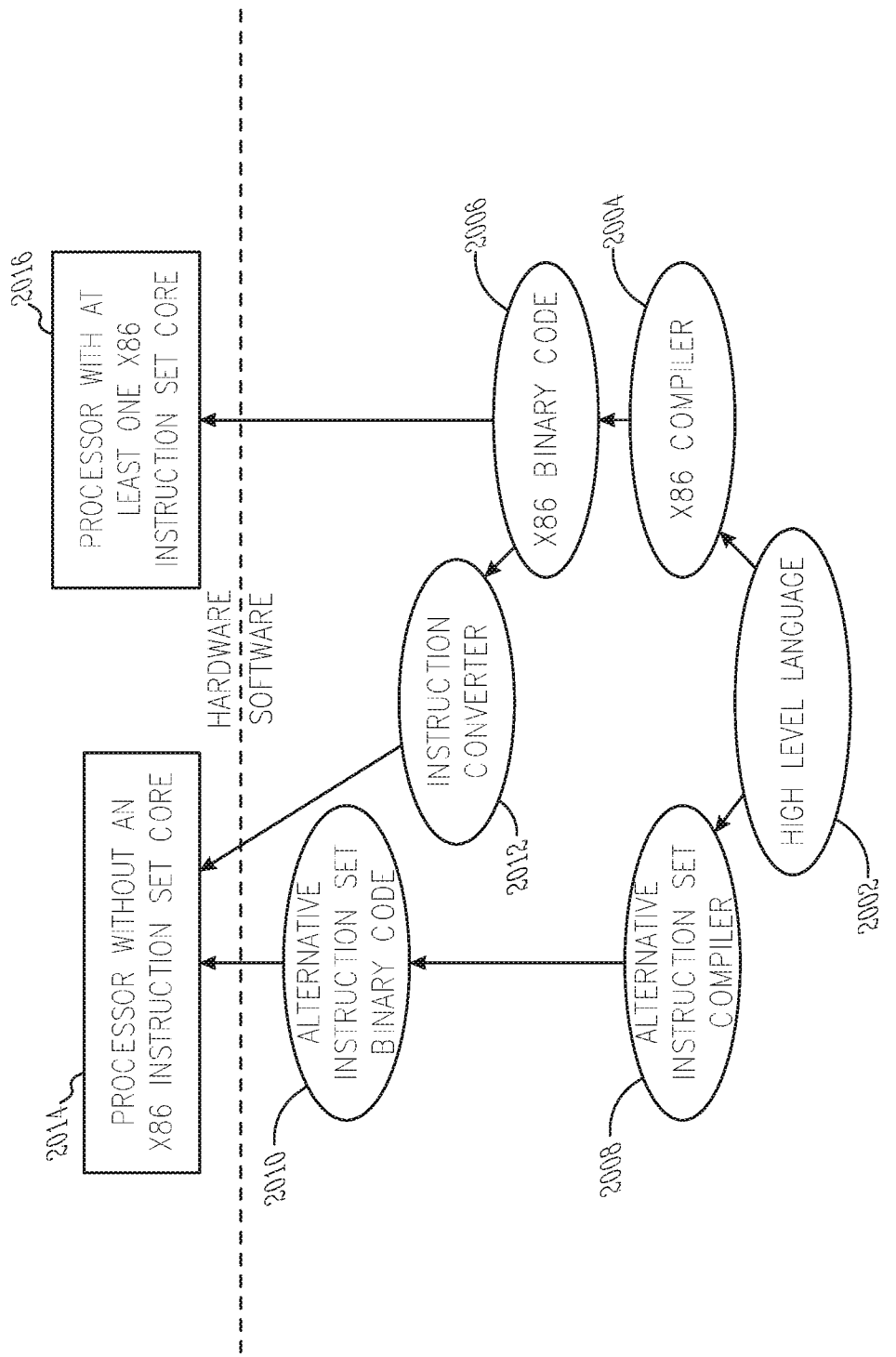
FIG. 22 is a block diagram contrasting the use of a software instruction converter to convert binary instructions in a source instruction set to binary instructions in a target instruction set according to some embodiments.

FIG. 22 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 22 shows a program in a high level language 2002 may be compiled using an x86 compiler 2004 to generate x86 binary code 2006 that may be natively executed by a processor with at least one x86 instruction set core 2016. The processor with at least one x86 instruction set core 2016 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 2004 represents a compiler that is operable to generate x86 binary code 2006 (e.g., object code) that can, with or without additional linkage processing, be executed on the processor with at least one x86 instruction set core 2016. Similarly, FIG. 22 shows the program in the high level language 2002 may be compiled using an alternative instruction set compiler 2008 to generate alternative instruction set binary code 2010 that may be natively executed by a processor without at least one x86 instruction set core 2014 (e.g., a processor with cores that execute the MIPS instruction set of MIPS Technologies of Sunnyvale, Calif. and/or that execute the ARM instruction set of ARM Holdings of Sunnyvale, Calif.). The instruction converter 2012 is used to convert the x86 binary code 2006 into code that may be natively executed by the processor without an x86 instruction set core 2014. This converted code is not likely to be the same as the alternative instruction set binary code 2010 because an instruction converter capable of this is difficult to make; however, the converted code will accomplish the general operation and be made up of instructions from the alternative instruction set. Thus, the instruction converter 2012 represents software, firmware, hardware, or a combination thereof that, through emulation, simulation or any other process, allows a processor or other electronic device that does not have an x86 instruction set processor or core to execute the x86 binary code 2006.

The invention claimed is:

1. An apparatus for a cryptographic hardware accelerator, comprising:

an Advanced Encryption Standard (AES) substitution box (S-box) for an AES encryption cipher, wherein the AES S-box is to perform an inversion followed by an AES affine transformation on input vectors, wherein the AES affine transformation uses a mapping matrix and translation vector as specified by the AES;

non-AES affine transformation circuitry for non-AES ciphers to perform affine transformations on 8-bit input vectors using variable mapping and translation functions; and, circuitry to perform an S-box function for non-AES ciphers that includes circuitry to: pass 8-bit input vectors to: the non-AES affine transformation circuitry having the mapping function to include multiplication by a matrix $A_{S1}$ and a translation function to include addition of a vector $b_{S1}$, pass the result of the affine transformation to the AES S-box and bypass the AES affine transformation so as to only perform an inversion, and pass the result of the S-box inversion to the non-AES affine transformation circuitry having the mapping function to include multiplication by a matrix $A_{S2}$ and the translation function to include addition of a vector $b_{S2}$.

2. The apparatus of claim 1, wherein:

affine transformations for the non-AES cipher are defined as being performed in a Galois extension field denoted as $GF_S(2^8)$ that is generated from $GF(2)$ by a specified field polynomial $S(x)$ of degree 8;

the AES S-box is to perform the inversion operation in a composite Galois field denoted as $GF_C((2^4)^2)$ that is generated by a specified field polynomial $P(x)$ of degree 2 from a ground field $GF_C(2^4)$ that is generated by a specified field polynomial $R(x)$ of degree 4 from $GF(2)$; and, the non-AES affine transformation circuitry's mapping function includes multiplication by a matrix $M_S$ that maps vectors from $GF_S(2^8)$ to $GF_C((2^4)^2)$ before inversion by the S-box and that includes multiplication by a matrix $M_S^{-1}$ that maps vectors from $GF_C((2^4)^2)$ to $GF_S(2^8)$ after inversion by the S-box.

3. The apparatus of claim 2 wherein:

affine transformations for the AES cipher are defined as being performed in a Galois extension field denoted as $GF_{AE}(2^8)$, wherein the $GF_{AE}(2^8)$ field is generated from a Galois field $GF(2)$ by a specified field polynomial $AE(x)$ of degree 8 where $AE(x)=(x^8+x^4+x^3+x+1)$;

the S-box is further to map vectors from the $GF_{AE}(2^8)$ field to the $GF_C((2^4)^2)$ field by multiplication in $GF(2)$ with a matrix $M_A$ before inversion and to map the inverted vectors back from $GF_C((2^4)^2)$ to $GF_{AE}(2^8)$ with a matrix $M_A^{-1}$ after inversion; and, the non-AES affine transformation circuitry's mapping function includes multiplication by the matrix $M_A^{-1}$ before inversion by the S-box and includes multiplication by the matrix $M_A$ after inversion by the S-box.

4. The apparatus of claim 3 further comprising:

a shift rows circuit, a mix column circuit, and a key addition circuit to perform encryption/decryption in accordance with the AES cipher; and wherein the circuitry to perform an S-box function for the non-AES cipher circuitry includes circuitry to bypass the shift rows circuit, mix column circuit, and key addition circuit.

5. The apparatus of claim 3 further comprising:

an AES encryption pathway through the AES S-box that includes a first encryption operation that multiplies an input vector by the matrix $M_A$, a second encryption operation that inverts the result, and a third encryption operation that performs the AES affine transformation followed by multiplication with the matrix $M_A^{-1}$;

an AES decryption pathway through the S-box that includes a first decryption operation that multiplies an input vector by the matrix $M_A$ followed by AES inverse affine transformation, a second decryption operation that inverts the result, and a third decryption operation that performs multiplication by the matrix $M_A^{-1}$;

wherein the circuitry to perform an S-box function for the non-AES cipher, in order to bypass the AES transformation and the AES inverse transformation of the AES S-box, includes a pathway through the S-box that includes the first encryption operation, the second encryption or decryption operation, and the third decryption operation.

6. The apparatus of claim 3 wherein:

the non-AES affine transformation circuitry's mapping function includes multiplication by the matrix product $M_S M_A^{-1} A_{S1}$ and its translation function includes addition of the vector product $M_S M_A^{-1} * b_1$ before inversion by the S-box; and, the non-AES affine transformation circuitry's mapping function includes multiplication by the matrix product $M_A M_S^{-1} A_{S2}$ and its translation function includes addition of the vector $b_2$ after inversion by the S-box.

7. The apparatus of claim 2 wherein the non-AES encryption cipher is SM4 where the field polynomial $S(x)$ is:

$$S(x)=(x^8+x^7+x^6+x^5+x^4+x^2+1).$$

8. The apparatus of claim 2 wherein the non-AES encryption cipher is Camellia where the field polynomial $S(x)$ is:

$$S(x)=(x^8+x^6+x^5+x^3+1).$$

9. The apparatus of claim 1 wherein the apparatus is incorporated into a central processing unit (CPU) accessible by the CPU's instruction set.

10. The apparatus of claim 1 wherein the apparatus is incorporated into a coprocessor or other device to interface to a central processing unit (CPU).

11. A method to perform non-Advanced Encryption Standard (AES) cipher operations, comprising:

performing a first non-AES affine transformation on a non-AES cipher input vector, wherein the first non-AES affine transformation is a mapping that includes multiplication by a matrix $A_{S1}$ and a translation that includes addition of a vector $b_{S1}$;

passing the input vector after the first non-AES affine transformation to an AES substitution box (S-box) for an AES encryption cipher, wherein the AES S-box performs an inversion followed by an AES affine transformation on input vectors, wherein the AES affine transformation uses a mapping matrix and translation vector as specified by the AES;

bypassing the AES affine transformation of the AES S-box; and, performing a second non-AES affine transformation on the input vector after inversion by the AES S-box, wherein the second non-AES affine transformation is a mapping that includes multiplication by a matrix $A_{S2}$ and a translation that includes addition of a vector $b_{S2}$.

12. The method of claim 11, wherein:

non-AES affine transformations for the non-AES cipher are defined as being performed in a Galois extension field denoted as $GF_S(2^8)$ that is generated from $GF(2)$ by a specified field polynomial $S(x)$ of degree 8;

the AES S-box performs the inversion operation in a composite Galois field denoted as $GF_C((2^4)^2)$ that is generated by a specified field polynomial $P(x)$ of degree 2 from a ground field $GF(2^4)$ that is generated by a specified field polynomial $R(x)$ of degree 4 from $GF(2)$;

the first non-AES affine transformation is a mapping that includes multiplication by a matrix $M_S$ that maps vectors from $GF_S(2^8)$ to $GF_C((2^4)^2)$; and, the second non-AES affine transformation is a mapping that includes multiplication by a matrix $M_S^{-1}$ that maps vectors from $GF_C((2^4)^2)$ to $GF_S(2^8)$.

13. The method of claim 12 wherein affine transformations for the AES cipher are defined as being performed in a Galois extension field denoted as $GF_{AE}(2^8)$, wherein the $GF_{AE}(2^8)$ field is generated from a Galois field GF(2) by a specified field polynomial AE(x) of degree 8 where $AE(x)=(x^8+x^4+x^3+x+1)$;

wherein the AES S-box maps vectors from the $GF_{AE}(2^8)$ field to the $GF_C((2^4)^2)$ field by multiplication in GF(2) with a matrix $M_A$ before inversion and maps the inverted vectors back from $GF_C((2^4)^2)$ to $GF_{AE}(2^8)$ with a matrix $M_A^{-1}$ after inversion;

the first non-AES affine transformation is a mapping that includes multiplication by the matrix $M_A^{-1}$; and, the second non-AES affine transformation is a mapping that includes multiplication by the matrix $M_A$.

14. The method of claim 13 wherein the AES acceleration hardware includes a shift rows circuit, a mix column circuit, and a key addition circuit to perform encryption/decryption in accordance with the AES cipher, and further comprising bypassing the shift rows circuit, mix column circuit, and key addition circuit when performing non-AES cipher operations.

15. The method of claim 13 wherein:

an AES encryption pathway through the AES S-box includes a first encryption operation that multiplies an input vector by the matrix $M_A$, a second encryption operation that inverts the result, and a third encryption operation that performs the AES affine transformation followed by multiplication with the matrix $M_A^{-1}$;

an AES decryption pathway through the AES S-box includes a first decryption operation that multiplies an input vector by the matrix $M_A$ followed by AES inverse affine transformation, a second decryption operation that inverts the result, and a third decryption operation that performs multiplication by the matrix $M_A^{-1}$; and, further comprising bypassing the AES affine transformation and the AES inverse transformation of the S-box by traversing a pathway through the S-box that includes the first encryption operation, the second encryption or decryption operation, and the third decryption operation.

16. The method of claim 13 further comprising:

performing the first non-AES affine transformation with a mapping function that includes multiplication by the matrix product $M_S M_A^{-1} A_{S1}$ and with a translation function that includes addition of the vector product $M_S M_A^{-1} * b_1$; and, performing the second non-AES affine transformation with a mapping function that includes multiplication by the matrix product $M_A M_S^{-1} A_{S2}$ and with a translation function that includes addition of the vector $b_2$ after inversion by the S-box.

17. The method of claim 12 wherein the non-AES encryption cipher is SM4 where the field polynomial S(x) is:

$S(x)=(x^8+x^7+x^6+x^5+x^4+x^2+1)$.

18. The method of claim 12 wherein the non-AES encryption cipher is Camellia where the field polynomial S(x) is:

$S(x)=(x^8+x^6+x^5+x^3+1)$.

19. A non-transitory computer-readable storage medium comprising instructions to cause processing circuitry having an instruction set for Advanced Encryption Standard (AES) cryptographic hardware acceleration, upon execution of the instructions by the processing circuitry, to:

perform a first non-AES affine transformation on a non-AES cipher input vector, wherein the first non-AES affine transformation is a mapping that includes multiplication by a matrix $A_{S1}$ and a translation that includes addition of a vector $b_{S1}$;

pass the input vector after the first non-AES affine transformation to an AES substitution box (S-box) for an AES encryption cipher, wherein the AES S-box performs an inversion followed by an AES affine transformation on input vectors, wherein the AES affine transformation uses a mapping matrix and translation vector as specified by the AES;

bypass the AES affine transformation of the AES S-box; and, perform a second non-AES affine transformation on the input vector after inversion by the AES S-box, wherein the second non-AES affine transformation is a mapping that includes multiplication by a matrix $A_{S2}$ and a translation that includes addition of a vector $b_{S2}$.

20. The medium of claim 19, wherein:

affine transformations for the non-AES cipher are defined as being performed in a Galois extension field denoted as $GF_S(2^8)$ that is generated from GF(2) by a specified field polynomial S(x) of degree 8;

the AES S-box performs the inversion operation in a composite Galois field denoted as $GF_C((2^4)^2)$ that is generated by a specified field polynomial P(x) of degree 2 from a ground field $GF(2^4)$ that is generated by a specified field polynomial R(x) of degree 4 from GF(2);

the first non-AES affine transformation means is a mapping that includes multiplication by a matrix $M_S$ that maps vectors from $GF_S(2^8)$ to $GF_C((2^4)^2)$; and, the second non-AES affine transformation means is a mapping that includes multiplication by a matrix $M_S^{-1}$ that maps vectors from $GFdC(2^4)^2)$ to $GF_S(2^8)$.

21. The medium of claim 20 wherein the non-AES encryption cipher is SM4 where the field polynomial S(x) is:

$S(x)=(x^8+x^6+x^5+x^4+x^2+1)$.

22. The medium of claim 20 wherein the non-AES encryption cipher is Camellia where the field polynomial S(x) is:

$S(x)=(x^8+x^6+x^5+x^3+1)$.

23. The medium of claim 19 wherein:

affine transformations for the AES cipher are defined as being performed in a Galois extension field denoted as $GF_{AE}(2^8)$, wherein the $GF_{AE}(2^8)$ field is generated from a Galois field GF(2) by a specified field polynomial AE(x) of degree 8 where $AE(x)=(x^8+x^4+x^3+x+1)$;

the AES S-box maps vectors from the $GF_{AE}(2^8)$ field to the $GF_C((2^4)^2)$ field by multiplication in GF(2) with a matrix $M_A$ before inversion and maps the inverted vectors back from $GF_C((2^4)^2)$ to $GF_{AE}(2^8)$ with a matrix $M_A^{-1}$ after inversion;

the first non-AES affine transformation is a mapping that includes multiplication by the matrix $M_A^{-1}$; and, the second non-AES affine transformation is a mapping that includes multiplication by the matrix $M_A$.

24. The medium of claim 19 further comprising instructions to:

perform the first non-AES affine transformation with a mapping function that includes multiplication by the matrix product $M_S M_A^{-1} A_{S1}$ and with a translation function that includes addition of the vector product $M_S M_A^{-1} * b_1$; and, perform the second non-AES affine transformation with a mapping function that includes multiplication by the matrix product $M_A M_S^{-1} A_{S2}$ and with a translation function that includes addition of the vector $b_2$ after inversion by the S-box.

25. The medium of claim 19 wherein the processing circuitry is a central processing unit (CPU) having an instruction set for AES hardware acceleration and affine transformations.

* * * * *